(12) United States Patent
Rousu

(10) Patent No.: US 9,391,762 B2
(45) Date of Patent: Jul. 12, 2016

(54) SWITCH ARRANGEMENT AND APPARATUS

(71) Applicant: Broadcom Corporation, Irvine, CA (US)

(72) Inventor: Seppo Olavi Rousu, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 115 days.

(21) Appl. No.: 14/250,628

(22) Filed: Apr. 11, 2014

(65) Prior Publication Data
US 2014/0307599 A1 Oct. 16, 2014

(30) Foreign Application Priority Data

Apr. 15, 2013 (GB) .................................. 1306819.2

(51) Int. Cl.
*H04L 5/08* (2006.01)
*H04L 5/14* (2006.01)
*H04B 7/26* (2006.01)
*H04B 1/00* (2006.01)
*H04B 1/40* (2015.01)
*H04L 5/00* (2006.01)
*H04L 5/16* (2006.01)

(52) U.S. Cl.
CPC *H04L 5/08* (2013.01); *H04B 1/006* (2013.01); *H04B 1/40* (2013.01); *H04B 7/2621* (2013.01); *H04L 5/001* (2013.01); *H04L 5/0023* (2013.01); *H04L 5/0028* (2013.01); *H04L 5/1461* (2013.01); *H04L 5/16* (2013.01)

(58) Field of Classification Search
None
See application file for complete search history.

(56) References Cited

U.S. PATENT DOCUMENTS

| 8,909,165 | B2 * | 12/2014 | Hendin | H04B 1/006 455/226.1 |
|---|---|---|---|---|
| 2004/0239442 | A1 | 12/2004 | Wilcox | |
| 2013/0215808 | A1 * | 8/2013 | Muthukrishnan | H02H 9/045 370/297 |
| 2014/0087670 | A1 * | 3/2014 | Bai | H04B 1/40 455/73 |
| 2014/0148215 | A1 * | 5/2014 | Liu | H01Q 21/28 455/552.1 |
| 2014/0169243 | A1 * | 6/2014 | Khlat | H04L 5/08 370/297 |
| 2014/0170995 | A1 * | 6/2014 | Lin | H04B 1/44 455/83 |
| 2014/0335802 | A1 * | 11/2014 | Zhao | H04B 1/48 455/83 |

FOREIGN PATENT DOCUMENTS

| GB | 2393365 | 3/2004 |
|---|---|---|
| KR | 20020054523 | 7/2002 |
| WO | 2012109262 | 8/2012 |

* cited by examiner

*Primary Examiner* — Chi H Pham
*Assistant Examiner* — Soon-Dong D Hyun
(74) *Attorney, Agent, or Firm* — Oblon, McClelland, Maier & Neustadt, L.L.P.

(57) ABSTRACT

A switch arrangement is described which enable the design of a flexible front end allowing many individual and combinations of frequency band allocations to share a single antenna simultaneously. An apparatus using the switch arrangement is also described. The switch arrangement provides a single pole switch for each set of band specific filtering. The band specific filtering is connected to the pole of a respective single pole switch. The single pole switch has contact points enabling connection to of the filtering to an antenna switch both with and without a frequency selective component in the signal path. The frequency selective component allows sharing of the antenna by two or more frequency band allocations to enable simultaneous use of different radio access technologies, MIMO or Carrier Aggregation through a single antenna. When not required the frequency selective component can be switched out of the signal path to reduce insertion loss.

20 Claims, 15 Drawing Sheets

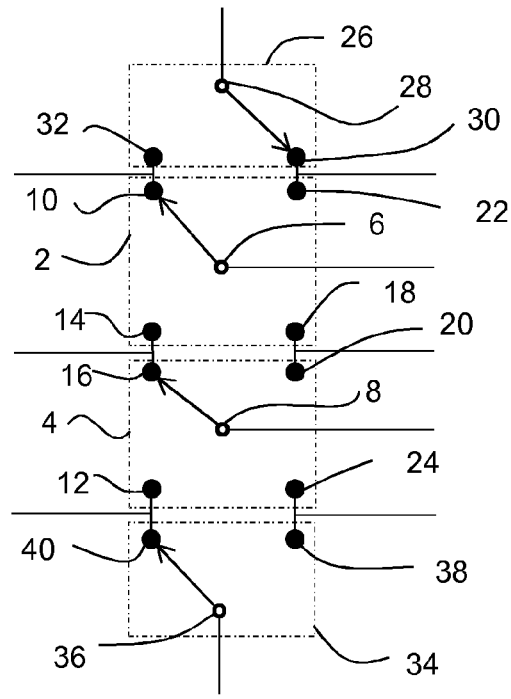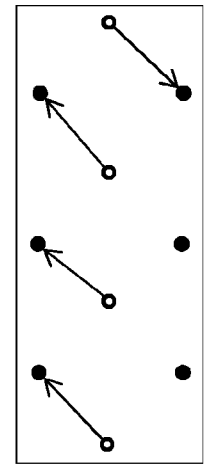
Fig. 1
Fig. 1A
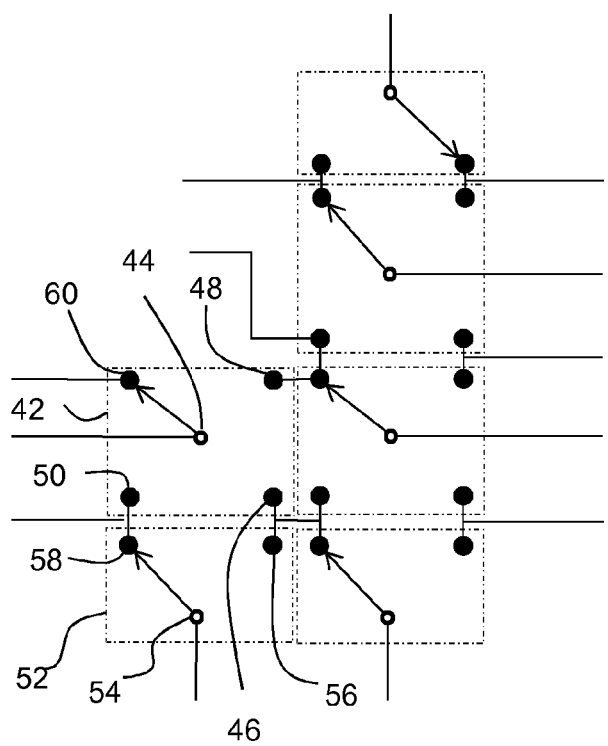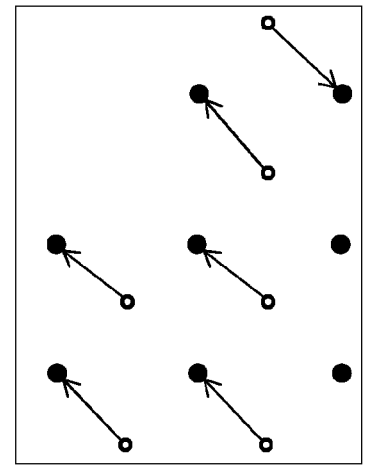
Fig. 2
Fig. 2A

SWITCH ARRANGEMENT AND APPARATUS

TECHNICAL FIELD

The present invention relates to a switching arrangement and apparatus that allows an antenna to be selectively switched to different frequency selective band specific filtering. Particular examples relate to a switching arrangement and apparatus that allow an antenna to be shared for carrier aggregation and/or with two or more alternative radio access technologies (RAT).

BACKGROUND

As mobile communication technology develops the number of frequency bands on which data can be transmitted continues to increase. As of 3GPP Release 11 there are many frequency band allocations defined which can be used for transmission and/or reception of data using frequency division duplexing (FDD) or time division duplexing (TDD). The frequency of the uplink portion, downlink portion and available bandwidth vary for each frequency band allocation. Although it is possible to provide an antenna which will operate across these frequency bands, band specific frequency selective filtering is required for component carriers.

Carrier Aggregation (CA) allows higher data rates by transmitting and/or receiving data over two or more carriers. The carriers can in general be in the same or different frequency band allocations. Furthermore, two or more carriers may be at same frequency.

It is desirable for a wireless device to operate across as many frequency bands as possible to improve its compatibility with different operators and geographical areas. The design becomes challenging as the number of frequency bands and combinations for CA increase. A more complicated switching arrangement typically increases insertion loss and reduces apparatus performance. Insertion loss is the loss in power due to the insertion of a component into the signal path. Strict constraints can be placed on the wireless device performance by network operators, and it can be difficult to meet these constraints as the number of bands and band combinations for CA continue to increase. For example, network cell locations are planned according to devices that are not CA capable. When CA capable devices are used, the impact of the insertion loss introduced by the components to allow CA reduces the operational range. Re-planning cell locations to account for the reduced range of CA capable devices would introduce large costs.

US-2004/0239442A1 discusses a quad band antenna interface. A diplexer is permanently provided in the signal path of all four bands to allow multiplexing of high and low frequency signals through a single antenna. The diplexer provides a permanent insertion loss penalty. WO-2012/109262A discusses a method of improving insertion loss in a multiband device. A bypass switch is provided to route uplink signals around a multiplexer when the device is operating in single band mode, reducing the uplink insertion loss in single band mode.

BRIEF DESCRIPTION OF THE DRAWINGS

FIG. 1 is a diagrammatic representation of an example of a switch arrangement for two frequency bands according to an embodiment;

FIG. 1A is a simplified diagrammatic representation of the switch arrangement of FIG. 1 used in later figures for clarity;

FIG. 2 is a diagrammatic representation of an example of a switch arrangement for three frequency bands according to another embodiment;

FIG. 2A is a simplified diagrammatic representation of the switch arrangement of FIG. 2 used in later figures for clarity;

The same reference number is used to indicate the same part throughout the drawings.

DETAILED DESCRIPTION

Figure 3:
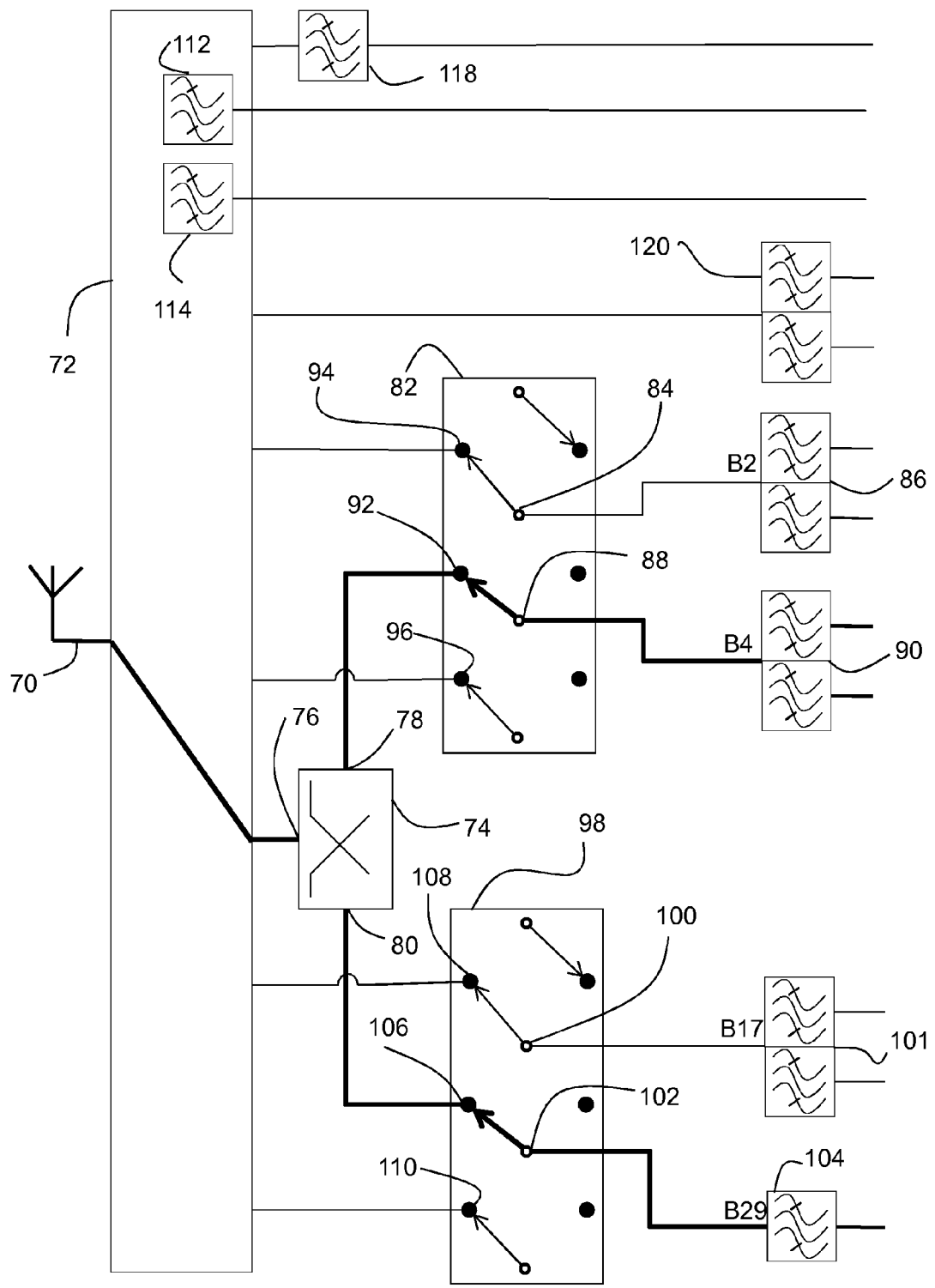
FIG. 3 is a diagrammatic representation of an example of an apparatus of an embodiment using the switching arrangement of FIG. 1.

In a first embodiment of the invention, there is provided a switch arrangement for connecting at least one frequency division multiplexer selectively in a signal path for at least two frequency bands. The switch arrangement comprises a first and a second single pole switch. The first single pole switch has: a pole for connection to filtering for a first frequency band, a first contact point, and a second contact point. The second single pole switch has: a pole for connection to filtering for a second frequency band, a first contact point, and a second contact point. Wherein, the second contact point of the first single pole switch is connected to or shared with the second contact point of the second single pole switch, thereby providing a single connection for a filtered terminal of a frequency division multiplexer which is shared by the first and second single pole switch.

In another embodiment of the invention, there is provided an apparatus for selective sharing of an antenna for at least one of carrier aggregation, MIMO and multiple simultaneous radio access technologies. The apparatus comprises:

an antenna switch having an antenna terminal for connection to an antenna and a plurality of switchable terminals which can be selectively connected to the antenna terminal;

a frequency division multiplexer having a common terminal and at least two filtered terminals, wherein the common terminal is connected, directly or indirectly, to a switchable terminal of the antenna switch; and a switch arrangement comprising:
a first single pole switch having:
a pole for connection to filtering for a first frequency band,
a first contact point connected, directly or indirectly, to a switchable terminal of the antenna switch, and
a second contact point; and
a second single pole switch having:
a pole for connection to filtering for a second frequency band,
a first contact point connected, directly or indirectly, to a switchable terminal of the antenna switch, and
a second contact point;
wherein the second contact point of the first single pole switch is connected to or shared with the second contact point of the second single pole switch and connected, directly or indirectly, to one of the at least two filtered terminals of the frequency division multiplexer.

Further features and advantages of the invention will become apparent from the following description of preferred embodiments of the invention, given by way of example only, which is made with reference to the accompanying drawings.

Examples of embodiments of the invention provide a switching arrangement allowing selective switching of multiplexers and/or matching networks in the signal path of one or more, for example at least two, frequency bands.

"Wireless devices" include in general any device capable of connecting wirelessly to a network, and includes in particular mobile devices including mobile or cell phones (including so-called "smart phones"), personal digital assistants, pagers, tablet and laptop computers, wearable communication devices, content-consumption or generation devices (for music and/or video for example), data cards, USB dongles, vehicles (for example connected cars), devices with wireless communication capability to communication counterpart etc., as well as fixed or more static devices, such as personal computers, game consoles, consumer electronics, public safety devices and other generally static entertainment devices, various other domestic and non-domestic machines and devices, etc. The term "user equipment" or UE is often used to refer to wireless devices in general, and particularly mobile wireless devices.

The terms "transmitter" and "receiver" are also used herein and are to be construed broadly to include the whole of a device that is transmitting/receiving wireless signals as well as only particular components of a device that are concerned with transmitting/receiving wireless signals or causing or leading to the transmission/reception of wireless signals.

Reference will sometimes be made to "poles", "throws" and "contact points" when discussing switches and switch arrangements. As used herein, a pole is a singular connection point of a switch that can be selectively connected to more than one other connection point. The other connection points that the pole can connect to via the switch are referred to herein as contact points, of which there may be several. A throw as used herein refers to a number of positions between which the switch can change in order to form a connection between the pole and one of the contact points. Thus, for example, a single-pole, double-throw (SPDT) switch will comprise one pole (hence the term "single-pole") and two contact points. The pole can be selectively connected to either of the two contact points. As the switch can be "thrown" into two different positions or configurations in order to form connections with the two contact points, the switch is given the name "double-throw".

Throughout the drawings contact points are depicted as a solid black circle and poles are depicted as circles with a white middle. The connection from the pole to a contact point is depicted by an arrow extending from the pole to the selected contact point. The direction of the arrow is so that the selective nature of the connection from the pole to the contact point is understood. The arrow is always shown pointing away from the pole: it is not indicative of or restrictive on the direction of a signal path. While particular configurations of switches in which the poles are shown connected to certain contact points are depicted, the embodiments are not limited only to the switches being in the configurations depicted, which are provided as examples to assist understanding.

A first example of a switch arrangement according to an embodiment of the invention is depicted in FIG. 1. In the following description, reference will be made to how certain of the components making up the switching arrangement are for connection to other components. This represents one use of the switching arrangement, other uses are possible where other components are connected to the switching arrangement in different ways. It comprises two Single Pole Switches (SPS) 2, 4 each of which has a single pole and a plurality of Contact Points (CP). In the embodiment of FIG. 1 there are four CPs provided for each switch, although other embodiments may have fewer or more CPs.

The pole 6 of a first SPS 2 is for connection to filtering for a first frequency band. The pole 8 of a second SPS 4 is for connection to filtering of a second frequency band. A first CP 10 of the first SPS 2 is provided for connection to an antenna switch. A first CP 12 of the second SPS 4 is provided for connection to an antenna switch. A second CP 14 of the first SPS 2 is connected to a second CP 16 of the second SPS 4. In some embodiments, a common CP may be provided which is shared by both the first SPS 2 and the second SPS 4. The connection between the second CP 14 of the first SPS 2 and the second CP 16 of the second SPS provides a common or shared connection to which a frequency selective component, such as a frequency division multiplexer, can be connected. Therefore, the switch arrangement as described so far allows a first and second band to be selectively connected directly to an antenna switch or to a frequency selective component. The frequency selective component need only be in the signal path when required. In some embodiments the frequency selective component is not connected directly to the switch arrangement, for example other component may be present between the frequency selective component and the switching arrangement.

The switching arrangement allows a wide variety of different connections between components to be achieved. Connected to other components as described above, in use, this construction allows both uplink and downlink paths to bypass a frequency selective component when it is not required, thus reducing insertion loss for both uplink and downlink paths. A further benefit is that this construction allows the band specific filtering connected to the poles 6, 8 to share a single frequency selective component. It can be the case that the frequency selective component is designed with a pass band allowing two or more frequency bands to use the same filtered connection when their frequencies are in the pass band.

Further features depicted in FIG. 1 will now be described. One or more of these further features may be omitted in further embodiments.

The first SPS 2 and the second SPS 4 can each have a third CP 18, 20. The third CP 18 of the first SPS 2 and the third CP 20 of the second SPS 4 are connected together. In other embodiments the third CPs 18, 20 may be provided by a shared or common CP. This provides another common or shared connection to which a frequency selective component, such as a frequency division multiplexer, can be connected. This allows each of the first and second bands to be connected to another frequency selective component. A different frequency selective component with different frequency cut off characteristics might be needed to allow for operation in a different geographical region or with a different network operator where different combinations of bands can be used in carrier aggregation.

In an embodiment a frequency selective component can have an adjustable corner frequency (for example in the case of a diplexer) or corner frequencies (for example in the case of a triplexer or quadplexer). In this way the frequency response of the frequency selective component can be altered according to aggregated radio use cases or two or more RATs. An adjustable frequency selective component may support two or more different frequency selective component radio use cases.

In an embodiment the connection between the second CP 14 of the first SPS 2 and the second CP 16 of the second SPS 4 provides a common or shared connection to which a frequency selective component, such as an antenna frequency division multiplexer, can be connected. This may be a low pass port of an antenna port for example. A high pass port may be connected to another switching arrangement in the same way.

In a further embodiment the antenna frequency division multiplexer may contain or be connected to an antenna impedance tuner. For example, the antenna impedance tuner may be in a common antenna path, connected between the antenna and an antenna switch. Alternatively, an antenna tuner can be connected after a frequency division multiplexer, for example after the frequency selective ports of a frequency division multiplexer when considered in the direction away from the antenna. This can allow antenna impedance to be controlled independently for each frequency selective path of the frequency division multiplexer. In some embodiments a frequency division multiplexer can convey more than one carrier through each frequency selective path; for example a diplexer may convey more than one signal with a frequency above and/or below its corner frequency.

The first SPS 2 can also have a further CP 22 to which a frequency selective component specific to the band connected to the pole 6 of the first SPS can be connected. Likewise, the second SPS 4 can also have a further CP 24 to which a frequency selective component specific to the band connected to the pole 8 of the second SPS can be connected. The frequency selective component or components can be connected between the further CP 22, 24 and an antenna switch, if an output is available. Frequency selective components include for example matching components or networks and frequency division multiplexers. These may be implemented inside and/or outside a package containing the switching arrangement, for example by one or more discrete components, integrated components, or designed structures integrated with the switching arrangement in a single module as 2D or 3D components.

In some embodiments, when both the first SPS 2 and the second SPS 4 have a further CP 22, 24, these can be connected to ends of a matching network connected to the antenna switch, where the matching network is configured to allow frequency bands close to each other in frequency to share a single antenna in carrier aggregation modes. In this configuration the matching network will function similar to a frequency division multiplexer but the first and second bands are connected to different terminals rather than a shared one as would be case if the common or shared connection provided by the second CPs 14, 16 or third CPs 18, 20 was used.

In other embodiments, when both the first SPS 2 and the second SPS 4 have a further CP 22, 24, these can be connected to respective terminals of a frequency division multiplexer. For example a different frequency selective component with different frequency cut off characteristics might be needed for some band combinations in carrier aggregation or when two or more Radio Access Technologies (RAT) are used. To give one example, 3GPP Band 7 has a lowest frequency of 2500 MHz and 3GPP Band 3 has a highest frequency of 1880 MHz. Either band 3 or band 7 could be combined with 3GPP Band 8, which has a highest frequency of 960 MHz, by connecting them to the "high" connection of a diplexer designed to have a low/high cut off frequency of 1 GHz the a common shared CP, such as the CPs 14, 16. However, such a diplexer is not acceptable if 3GPP Bands 3 and 7 are to be combined. This construction allows a diplexer for multiplexing bands 3 and 7, for example having a high/low cut off frequency of 2 GHz, to be connected to the further CPs 22, 24.

A first matching switch 26 can be provided for use with the first SPS 2. The first matching switch 26 has a single pole 28 for connection to one end of a matching network, a first CP 30 and a second CP 32. The first CP 30 is connected to the further CP 22 of the first SPS 2 for connection to another end of the matching network. The second CP 32 of the first matching switch 26 is connected to the antenna switch. It can also be connected to the first CP 10 of the first SPS. In other embodiments the first CP 30 of the first matching switching switch 26 can be common to or shared with the further CP 22 of the first SPS 2. Likewise, the second CP 32 of the first matching switch 26 can be common to or shared with the first CP 10 of the first SPS 2. With this configuration a matching network connected between the pole 28 and the first CP 30 of the first matching switch 26 can be connected in signal path of the first frequency band by setting the first matching switch 26 to the second CP 32 and the first SPS 2 to the further CP 22.

A second matching switch 34 can be provided for use with the second SPS 4. The construction and connection of the second matching switch 34 corresponds to the first matching switch 26, but with respect to the second SPS 4. Thus, the second matching switch 34 has a single pole 36 for connection to one end of a matching network, a first CP 38 and a second CP 40. The first CP 38 is connected to the further CP 24 of the second SPS 4 for connection to another end of the matching network. The second CP 40 of the second matching switch 34 is connected to the antenna switch. It can also be connected to the first CP 12 of the second SPS 4. In other embodiments the first CP 38 of the second matching switching switch 34 can be common to or shared with the further CP 24 of the second SPS 4. Likewise, the second CP 40 of the second matching switch 34 can be common to or shared with the first CP 12 of the second SPS 4.

The switches forming the switch arrangement of FIG. 1 can be of any suitable form, for example a solid state or an electromechanical switch. As discussed above, some elements of the switch arrangement of FIG. 1 can be omitted in embodiments where they are not required. Alternatively, the switch arrangement may be configurable to program any unused CPs and/or Poles into a high impedance state. This can simplify inventory management during manufacture by providing a single switching arrangement that can be used in many different configurations for different combinations of frequency bands.

FIG. 1A depicts a simplified diagrammatic representation of the switching arrangement of FIG. 1. This representation is used in later Figures to illustrate the switch arrangement of FIG. 1 in a clear manner so its potential connection to other components can be understood. It does not limit those embodiments to only use a switch arrangement as described and depicted in FIG. 1; any unused parts such as unconnected CPs may be omitted. Alternatively, unused CPs can be programmed to a high impedance state.

Referring now to FIG. 2, an embodiment is depicted in which the general principles of the embodiment of FIG. 1 have been extended to allow three frequency bands to be selectively connected to, or bypass, at least one frequency selective component, such as a multiplexer. The construction of the embodiment of FIG. 2 is the same as the embodiment of FIG. 1, except as described below. The features described above which can be omitted for FIG. 1 which are also depicted as present in the embodiment of FIG. 2 can be omitted in some embodiments.

A third SPS 42 is provided which has a pole 44 for connection to filtering for a third frequency band allocation and a first CP 46 for connection to an antenna switch. A second CP 48 is connected to or shared with the second 16 of the second SPS 4. Thus, in this configuration a third frequency band can be selectively connected to a frequency selective component via the second CP 48 or bypass the frequency selective component via the first CP 46. The first CP 46 can be connected to or shared with the first CP 12 of the second SPS 4.

Additional features associated with the third SPS 42 and depicted in FIG. 2 will now be described. These additional features can be omitted in some embodiments.

The third SPS can be provided with a further CP 50 for connection to matching components. A third matching switch 52 can also be provided for the third SPS 42 allowing a matching network to be selectively switched in the signal path of the third band. The third matching switch 52 is a single pole double throw switch with a pole 54 for connection to one end of a matching network, a first contact point 56 for connection to an antenna switch and a second CP 58 for connection to another end of the matching network. The second CP 58 of the third matching switch 52 can be connected to or shared with the further CP 50 of the third SPS 42.

As depicted in FIG. 2, although the third SPS 42 has a third CP 60 it is not connected to the third CPs 18, 20 of the first and second SPSs 2,4. This allows a simple topography for the connections between the devices in the switch arrangement. In other embodiments, for example using layered connections or another connection method, the third CP 60 of the third SPS 42 can be connected to the third CPs 18,20 of the first and second SPSs.

FIG. 2A depicts a simplified diagrammatic representation of the switch arrangement of FIG. 2 that will be used in further figures to illustrate examples in which the switch arrangement is used more clearly. The invention is not limited to the two-band and three-band switch arrangements described above. The principles of the invention can be extended to include more bands in a similar way to how the embodiment of FIG. 1 was expanded to three bands in the embodiment of FIG. 2. This may provide CA roaming capabilities, for example.

A switch arrangement as described above can be useful when it is desired to combine one or more frequency band allocations for the communication of data and/or voice using carrier aggregation. In order to increase the peak data rates per user and make better use of the available network resources, it has been proposed to use two or more carriers (in the downlink direction or uplink direction or both) and/or two or more frequencies or bands (again, in the downlink direction or uplink direction or both) and/or two or more data flows (again, in the downlink direction or uplink direction or both). In simple terms, by using two or more carriers in "carrier aggregation", a wireless device connects wirelessly using two or more network carriers to increase the peak data rates available and to make better use of the available resources by multiplexing the carriers, and achieves greater spectrum efficiency through joint resource allocation and balancing loads among the downlink and/or uplink carriers. In general, the carriers may from the same cell tower or two or more cell towers, for example the carriers may be in different but overlapping cells and may use the same or different frequencies (for example the frequencies may be intra band CA with one or more frequency/ies within a frequency band allocation or may be inter band CA with frequencies distributed over two or more band allocations), Long Term Evolution (LTE) or Long Term Evolution-Advanced or/and multiple HSPA carriers and may or may not use MIMO (multiple-input and multiple-output, i.e. the use of multiple antennas at both the transmitter and receiver to improve communication performance).

These proposals for multi-carrier and/or multi-band transmissions have application to many network transmission protocols, including wireless network transmission protocols in particular.

As a particular example, 3GPP makes use of HSPA which refers to the combination of high-speed downlink packet access (HSDPA) and high-speed uplink packet access (HSUPA). HSPA increases available data rates and also boosts capacity in UMTS networks and provides significant latency reductions. In 3GPP Release-8 and Release-9, the dual cell HSDPA (DC-HSDPA) and dual band DC-HSDPA (or DB-DC-HDSPA) features were introduced. Both these features allow a Node B to serve one or more users in the downlink direction by simultaneous operation of HSDPA on two different carrier frequencies in two geographically overlapping cells, thus improving the user experience across the entire cell coverage area. Whilst initially it was proposed to use two carriers or cells and two frequencies or bands, recent proposals extend this to more than two carriers/cells and more than two frequencies/bands (which will generically be referred to herein as multicarrier and multiband respectively). As a particular example, recent proposals in 3GPP provide for the use of eight network cells for this purpose (termed 8C-HSDPA or 8-Cell High Speed Downlink Packet Access), which in theory could provide a maximum physical layer throughput or bandwidth of 336 Mbps.

As the 3GPP releases progress further bands, and combinations of bands, are defined. Table 1 below gives details of the twenty-nine bands that can be used for Frequency Division Duplexing (FDD) as of 3GPP release 11.

TABLE 1

3GPP FDD Frequency Bands as at Release 11

| Band | Uplink Frequency Range (MHz) | Downlink Frequency Range (MHz) |
| --- | --- | --- |
| 1 | 1920-1980 | 2110-2170 |
| 2 | 1850-1910 | 1930-1990 |
| 3 | 1710-1785 | 1805-1880 |
| 4 | 1710-1755 | 2110-2155 |
| 5 | 824-849 | 869-894 |
| 6 | 830-840 | 865-875 |
| 7 | 2500-2570 | 2620-2690 |
| 8 | 880-915 | 925-960 |
| 9 | 1749.9-1784.9 | 1844.9-1879.9 |
| 10 | 1710-1770 | 2110-2170 |
| 11 | 1427.9-1447.9 | 1475.9-1495.9 |
| 12 | 698-716 | 728-746 |
| 13 | 777-787 | 746-756 |
| 14 | 788-798 | 758-768 |
| 15 | 1900-1920 | 2600-2620 |
| 16 | 2010-2025 | 2585-2600 |
| 17 | 704-716 | 734-746 |
| 18 | 815-830 | 860-875 |
| 19 | 830-845 | 875-890 |
| 20 | 832-862 | 791-821 |
| 21 | 1447.9-1462.9 | 1495.9-1510.9 |
| 22 | 3410-3490 | 3510-3590 |
| 23 | 2000-2020 | 2180-2200 |
| 24 | 1626.5-1660.5 | 1525-1559 |
| 25 | 1850-1915 | 1930-1995 |
| 26 | 814-849 | 859-894 |
| 27 | 807-824 | 852-869 |
| 28 | 703-748 | 758-803 |
| 29 | N/a Downlink only for use in carrier aggregation with other bands | 717-728 |

It can be seen from table 1 that each band generally requires band specific filtering (typically in the form of a duplexer) because the frequencies, channel widths and uplink/downlink distance are different for each band. In addition, it is proposed to combine two, three or more bands in carrier aggregation. Carrier Aggregation can take place between bands (so called "inter-band") and within a band (so called "intra-band"). In 3GPP release 11 the following inter-band FDD carrier aggregation pairs are defined: B3/B7, B4/B17, B4/B13, B4/B12, B20/B7, B2/B17, B4/B5, B5/B12, B5/B17, B20/B3, B20/B8, B3/B5, B1/B7 and B4/B7. With each release, further bands and band combinations are defined. For example, 3GPP release 12 currently proposes a further three FDD bands and another eight inter-band CA combinations. More are expected to be introduced in later releases. It is difficult to design a front end which can operate on many frequency bands and band combinations. Each component introduced into the signal path also introduces an insertion loss which will reduce the performance of the device. As the number of bands and band combinations increases the design of the front end becomes more and more difficult.

The switching arrangement of examples of embodiments of the invention allows the required components for carrier aggregation (such as multiplexers, for example diplexers, triplexers and quadplexers, matching, matching elements/networks, antenna diplexers, antenna impedance tuner capable antenna diplexers, antenna switches etc.) to be selectively switched in the signal path only when needed. A further advantage is that the number of switches introduced into the signal path for each band to achieve this may be as few as one, with two switches only needed for certain situations when matching is required. This results in minimal insertion loss introduced by the switch arrangement and has a double benefit. First, it reduces the worst case insertion loss and mismatch loss between components when components for carrier aggregation are switched in the signal path (because in that case the insertion loss of the switch is in addition to the insertion loss of the components for carrier aggregation). Second, it maximizes the benefit when carrier aggregation is not required (and therefore the carrier aggregation components are not required) because the insertion loss of a single switch is lower than the insertion loss of the carrier aggregation components. According to the particular implementation and selected topology, additional switches may be implemented to provide a high impedance state or a low impedance state when needed.

The switching arrangement of the invention is also simple to construct and extend to provide switching for multiple bands as required. Embodiments in which the switch arrangement of in the invention is used to create a multiband front end in which an antenna can be shared between several bands will now be described.

FIG. 3 depicts an apparatus for allowing selective sharing of an antenna 70 by a plurality of frequency bands. The antenna 70 can be switched to a single one of the plurality of frequency bands or shared by two or more frequency band allocations simultaneously in a carrier aggregation mode. The antenna may be a wide band antenna or the bandwidth of antenna 70 may be controllable, for example by using an aperture tuner. This may allow one or more radio use cases, CA use cases and combinations of radio use cases. It may also allow interference scenarios to be accounted for, the interference may be internal or external to the device, for example interference from the frequencies used for GPS or other positioning technologies.

The antenna 70 is connected to an antenna switch 72 which allows the antenna 70 to be connected to one of a plurality of terminals. For the purposes of clarity, the antenna switch is depicted as having nine terminals to which the antenna can be connected so that the various ways in which the antenna 70 can be connected to band-specific components can be explained. In other embodiments more or fewer terminals may be provided on the antenna switch depending on the frequency bands to which it is desired to connect it. An antenna switch having more terminals than are required to be connected can also be used in some embodiments, with unused terminals being programmed to a high impedance state, disconnected state or terminated state for example.

To allow the sharing of the antenna 70 by two or more bands in carrier aggregation mode, a multiplexer 74 has a common terminal 76 connected to one of the terminals of the antenna switch. In this embodiment the multiplexer is an example of a frequency selective component and is specifically a diplexer. The multiplexer 74 has a "high pass branch" filtered terminal 78, which passes signals with a frequency above a cut off frequency and a "low pass branch" filtered terminal 80, which passes signals with a frequency below the cut off frequency. The cut off frequency between the high and low terminals 78, 80 is between 1 and 1.5 GHz, although other embodiments can use other values appropriate to the frequency bands/ranges being combined. The multiplexer therefore allows two or more frequency bands/ranges to be combined and share the antenna 70 using frequency division multiplexing. One frequency band is below the cut off frequency and the other is above the cut off frequency.

A switching arrangement 82 according to the embodiment of FIG. 1 is provided for bypassing or switching the high pass terminal 78 in the signal path of two frequency bands above 1.5 GHz. The pole 84 of a first SPS provided as part of switching arrangement 82 is connected to band-specific filtering for a first frequency band, which in this case comprises Duplexer 86. The pole 88 of a second SPS provided as part of switching arrangement 82 is connected to second band-specific filtering for a second frequency band, which in this case comprises Duplexer 90. A first shared or common CP 92 for both the first SPS and the second SPS is connected to the high pass terminal 78 of the multiplexer. A second contact point 94 of the first SPS is connected to a terminal of the antenna switch 72. A second CP 96 of the second SPS is connected to another terminal of the antenna switch 72. In other embodiments the second CPs 94, 96 of the first and second SPS can be connected to the same terminal of the antenna switch 72. The remaining CPs and poles of the switching arrangement 82 are unused and may be programmed into a high impedance state. In other embodiments unused poles and CPs of the switching arrangement are omitted from the construction.

Thus, the connection of the switching arrangement 82 results in a single connection to the high pass terminal 78 of the multiplexer 74 which is by band-specific filtering for two frequency bands/ranges. This allows the high pass terminal to be connected in the signal path of a first band (via pole 84) or a second band (via pole 88). Should the first and second bands be used in isolation, and not in a carrier aggregation mode, the multiplexer can be bypassed by connecting the second CP 94 or 96 to the antenna switch 72, bypassing the multiplexer.

A second switching arrangement 98 according to the embodiment of FIG. 1 is provided for bypassing or switching the low pass terminal 80 in the signal path of two frequency bands below 1.5 GHz. The connections mirror those of the first switching arrangement 82. Namely, the pole 100 of a third SPS provided as part of second switching arrangement 98 is connected to band-specific filtering for a third frequency band, which in this case comprises duplexer 101. The pole 102 of a fourth SPS provided as part of second switching arrangement 98 is connected to fourth band-specific filtering for a fourth frequency band, which in this case comprises filter 104. Filter 104 is provided as an example of filtering for a frequency band which is not used for duplex transmissions, for example 3GPP band 29 which is provided for downlink use in carrier aggregation only. Other embodiments may provide a duplexer for a FDD frequency band allocation. A first shared or common CP 106 for both the third SPS and the fourth SPS is connected to the low pass terminal 80 of the multiplexer 74. A second contact point 108 of the third SPS is connected to a terminal of the antenna switch 72. A second CP 110 of the fourth SPS is connected to another terminal of the antenna switch 72. In other embodiments the second CPs 94, 96 of the third and fourth SPS can be connected to the same terminal of the antenna switch 72. The remaining CPs and poles of the switching arrangement 98 are unused and may be programmed into a high impedance state. In other embodiments unused poles and CPs of the switching arrangement are omitted from the construction.

Further band-specific filtering can be provided which is associated with frequency bands that are not used in carrier aggregation. The further band specific filtering can be provided in the antenna switch 72, for example filtering 112, 114 for the high band and low band filtering, respectively, for use with so called "2G" mobile communication such as GSM. Further band specific filtering can also be provided external to the antenna switch 72, for example by connecting a DCS receive filter 116 and a duplexer 120, to respective terminals of the antenna switch. It can be advantageous to connect frequency bands that will not be used for carrier aggregation directly to the antenna switch to avoid any insertion loss associated with the switching arrangements 82, 98. Nevertheless, in some embodiments, the further band specific filtering can be connected by extending the switching arrangements 82, 98. This can allow use of an antenna switch with fewer terminals which is beneficial to reduce the cost and/or physical size of the antenna switch.

The apparatus of FIG. 3 can be combined with a variety of different band specific components to allow a plurality of frequency bands to share a single antenna. In general terms, the apparatus of FIG. 3 allows either of two "high" frequency bands to be combined with either of two "low" frequency bands in carrier aggregation using the switching arrangements 82, 98. In addition further frequency bands can be provided for use without carrier aggregation which are limited only by the number of terminals on the antenna switch 72.

In a more specific configuration, the apparatus is configured to allow the use of 3GPP bands 2, 4, 17 and 29 to be combined in carrier aggregation combinations of 2+29, 4+29, 2+17 and 4+17. This combination of bands can be useful for use with a North American network operator for example. A duplexer for band 2 is connected to the pole 84 of the first SPS switch. A duplexer for band 4 is connected to the pole 88 of the second SPS switch. (Bands 2 and 4 are "High" frequency bands, with frequencies above 1.5 GHz.) A duplexer for band 17 is connected to the pole 100 of the third SPS switch. A receive filter for Band 29 is connected to the pole 102 of the fourth SPS switch. (Bands 17 and 29 as "Low" frequency bands, with frequencies below 1.5 GHz.) Further band-specific filtering can be provided for bands 1, 3, 5 and 7, which are not used in carrier aggregation in this embodiment, by providing a further three terminals (not illustrated) from the antenna switch with a duplexer in addition to the terminal depicted as connected to duplexer 120. DCS received and 2G High and Low bands are provided by other antenna switch terminals as described above. In some embodiments 2G reception signals may be conveyed in a similar manner as 3G/HSPA/LTE DL signals via a duplexer RX port providing wanted frequency selective filtering to LNA, down conversion and further processing.

The operation of the switching arrangements 82,98 and antenna switch 72 to allow sharing of the antenna 70 for the combinations of bands 2+29, 4+29, 2+17 and 4+17 and to allow bands 2, 4, 17 and 29 to use the antenna in isolation when carrier aggregation is not required is summarized in table 2 below. Table 2 lists the configurations of the antenna switch and each SPS switch in terms of the contact points and terminals connected in a signal path, using the reference numbers of FIG. 3. Connections from the antenna switch are referred to by the CP of an SPS switch or terminal of a multiplexer which is connected to the antenna 70. Where a band is not used, the connections are chosen to isolate the band specific components for that band. This can be achieved in a variety of ways and is indicated "I" in the connection description. In some embodiments isolation is achieved by connecting a pole to a CP which is not connected to the antenna switch; in other embodiments a dedicated "isolate" position can be provided in which the pole is not connected to any CP.

TABLE 2

Connections for band combinations in FIG. 3

| Operation Mode | 2 | 4 | 17 | 29 | 2 + 29 | 4 + 29 | 2 + 17 | 4 + 17 |
|---|---|---|---|---|---|---|---|---|
| Antenna Switch connected to: | 94 | 96 | 108 | 110 | 76 | 76 | 76 | 76 |
| First SPS Switch pole 84 connected to: | 94 | I | I | I | 92 | I | 92 | I |
| Second SPS Switch pole 88 connected to: | I | 96 | I | I | I | 92 | I | 92 |
| Third SPS Switch pole 100 connected to: | I | I | 108 | I | I | I | 106 | 106 |
| Fourth SPS Switch pole 102 connected to: | I | I | I | 110 | 106 | 106 | I | I |

As depicted in FIG. 3, the antenna switch and switch arrangements are configured for Band 4+29 carrier aggregation operation. Signal paths are shown in bold. In this embodiment isolation of bands 2 and 17 has been achieved by connecting the band specific filtering of those bands to the respective CP which would connected that band direct to the antenna switch 72. This isolates the filtering because that CP is disconnected from the antenna switch.

In other embodiments any other combination of two "low" and two "high" bands can be connected to the poles of the switching arrangement depending on specific requirements. For example, in a variant for use with a European network operator, filtering for 3GPP band 7 can be connected to the pole 84 of the first SPS, filtering for 3GPP band 3 can be connected to the pole 88 of the second SPS, filtering for 3GPP band 8 can be connected to the pole 100 of the third SPS and filtering for 3GPP band 20 can be connected to the pole 102 of the fourth SPS. (In this case the filtering for band 20 will be a duplexer rather than the single filter depicted in FIG. 3.) These bands can then be switched to share the antenna in combinations of 7+20, 7+8, 3+8 and 3+20.

In other embodiments, additional filtering can be provided between the switch arrangement of FIG. 1 and the signal path to the antenna switch. For example, additional filtering could be provided between the lower frequency terminal of the multiplexer and the shared or common CP 106 of the third and fourth SPS. Additional filtering can be useful to attenuate the harmonics to positioning receiver bands. For example 3GPP bands 13 and 14 may have harmonic relationships with the frequencies used by GPS. Additional filtering can also be useful to attenuate harmonics that could have an impact in carrier aggregation. For example when 3GPP bands 4 and 17 are operated in carrier aggregation, it can be advantageous to attenuate the 3rd harmonic of band 17 which could otherwise impact on band 4 downlink performance.

Figure 4:
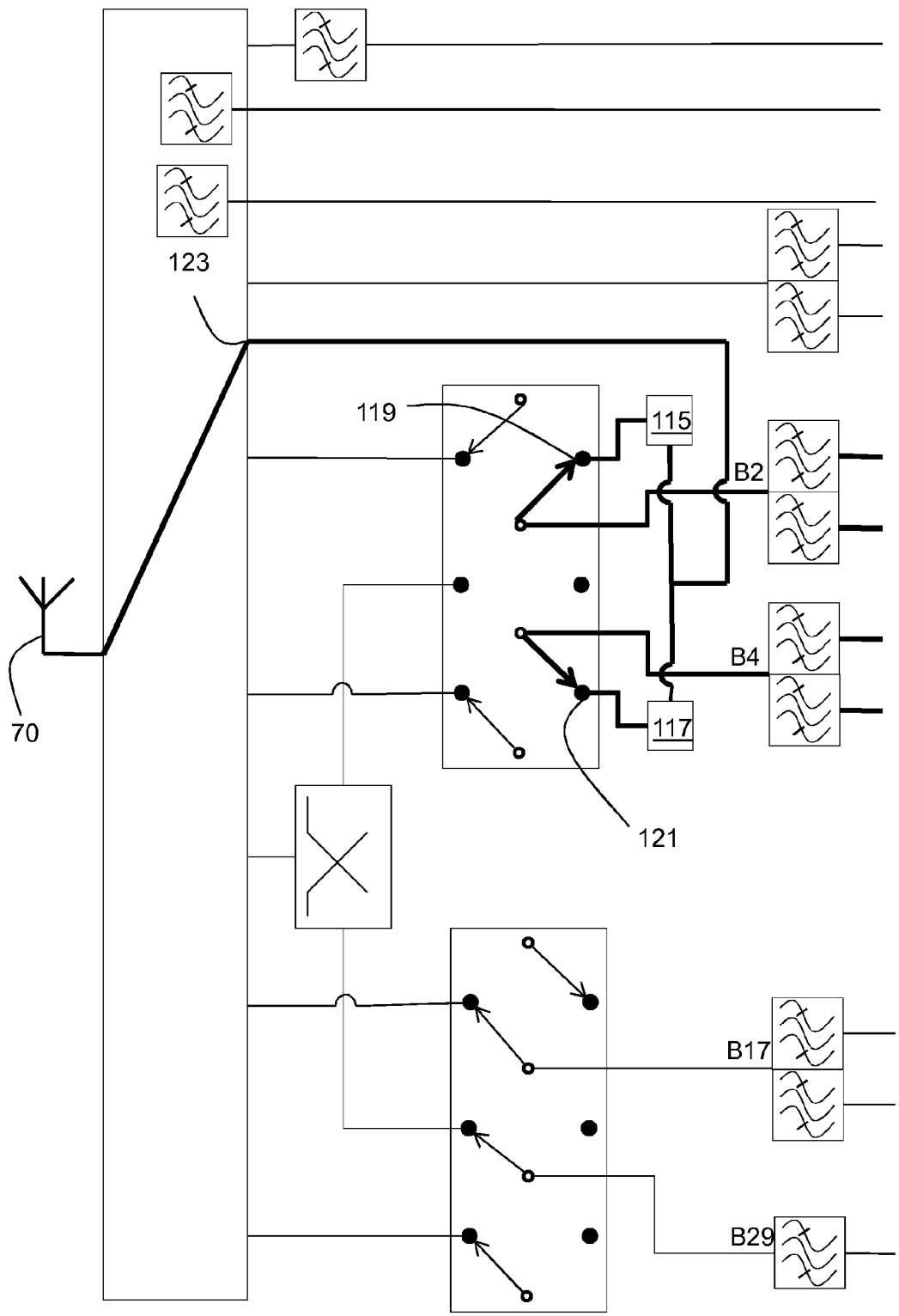
FIG. 4 is a diagrammatic representation of an example of an apparatus of another embodiment using the switching arrangement of FIG. 1.

FIG. 4 depicts an apparatus for allowing selective sharing of an antenna 70 by a plurality of frequency bands which uses the switching arrangement of FIG. 1. The antenna 70 can be switched to a single one of the plurality of frequency bands or shared by two frequency bands simultaneously in a carrier aggregation mode. The construction of this embodiment is the same as the embodiment of FIG. 3 except as described below.

In this embodiment matching components are provided to allow the combination of two bands which are close (but may also have larger frequency separation) in frequency in carrier aggregation. Specifically, matching is provided to allow the combination of two "high" bands in carrier aggregation. Matching is an example of a frequency selective component which allows two frequency bands to share an antenna when a diplexer is not suitable or is preferably avoided, such as where the bands operate on frequencies where a single cut off frequency is not sufficient to multiplex the bands. For example, a diplexer is not suitable when the transmit and/or receive frequency of one frequency band is between or overlaps the transmit and receive frequency band of the other frequency band for use in carrier aggregation.

Where bands are close in frequency it becomes difficult to design a frequency selective component with sufficiently sharp frequency cut-off characteristics for good performance so insertion loss may be increased. The ability to use carrier aggregation can offset this disadvantage. Examples of embodiments of the present invention allows any such frequency selective component to be in the signal path only when required, avoiding the associated insertion loss when those bands are not operating in a carrier aggregation mode.

A first matching 115 is provided for the first frequency band and a second matching 117 is provided for the second frequency band. Both first matching 115 and second matching 117 have a first end which is connected to other and provides a common terminal which is connected to the antenna switch. A second end of the first matching 115 is connected to a further contact point 119 of the first SPS switch. A second end of the second matching 117 is connected to a further contact point 121 of the second SPS switch.

In use, the first band and second band can be used in a carrier aggregation by setting the first SPS switch to the further contact point 119 and the second SPS switch to the further contact point 121. The antenna switch is then connected to a terminal 123 to which the common terminal of the first and second matching 115, 117 is connected. The third and fourth switches are set to an isolation position. For example, if the first frequency band is band 2 and the second frequency band is band 4 (as discussed above for the embodiment of FIG. 3), operation of 3GPP bands 2 and 4 in carrier aggregation mode is possible in this embodiment. The combination of 3GPP Bands 2 and 4 also demonstrates a situation where a diplexer is not suitable. The transmit (uplink) and receive (downlink) frequencies of Band 2 (1850-1910 MHz & 1930-1990 MHz respectively) is in between the transmit and receive frequencies for Band 4 (1710-1755 MHz & 2110-2155 MHz respectively).

In addition, 3GPP bands 2 and 4 can be used in isolation or in combinations with other bands as discussed above for the embodiment of FIG. 3. This embodiment allows more band combinations to be provided in a simple manner. A further advantage is that because the additional combination is provided by a further CP on the first and second SPS switches, the insertion loss when the first and second matching 115, 117 is switched out of the signal path is unchanged.

In another embodiment, the apparatus of FIG. 4 may be modified to allow sharing of the antenna by bands 3+7, 7+20, 7+8, 3+8 and 3+20 by connecting bands 3, 7, 8 and 20 to the switch arrangements as described above with reference to FIG. 3. In that configuration the matching 115, 117 can be replaced by a diplexer which allows multiplexing of bands 3+7 in carrier aggregation, for example diplexer with a high/low cut off frequency of around 2.2 GHz. This embodiment can also be modified by including a second antenna optimized for the frequency of band 7 or bands 3 and 7, for example in a similar way as discussed with reference to FIGS. 10 and 11 below.

In further embodiments a frequency selective component, such as matching or a multiplexer for example, can be associated with a further CP of the third SPS and a further CP of the fourth SPS in the second switching arrangement.

Figure 5:
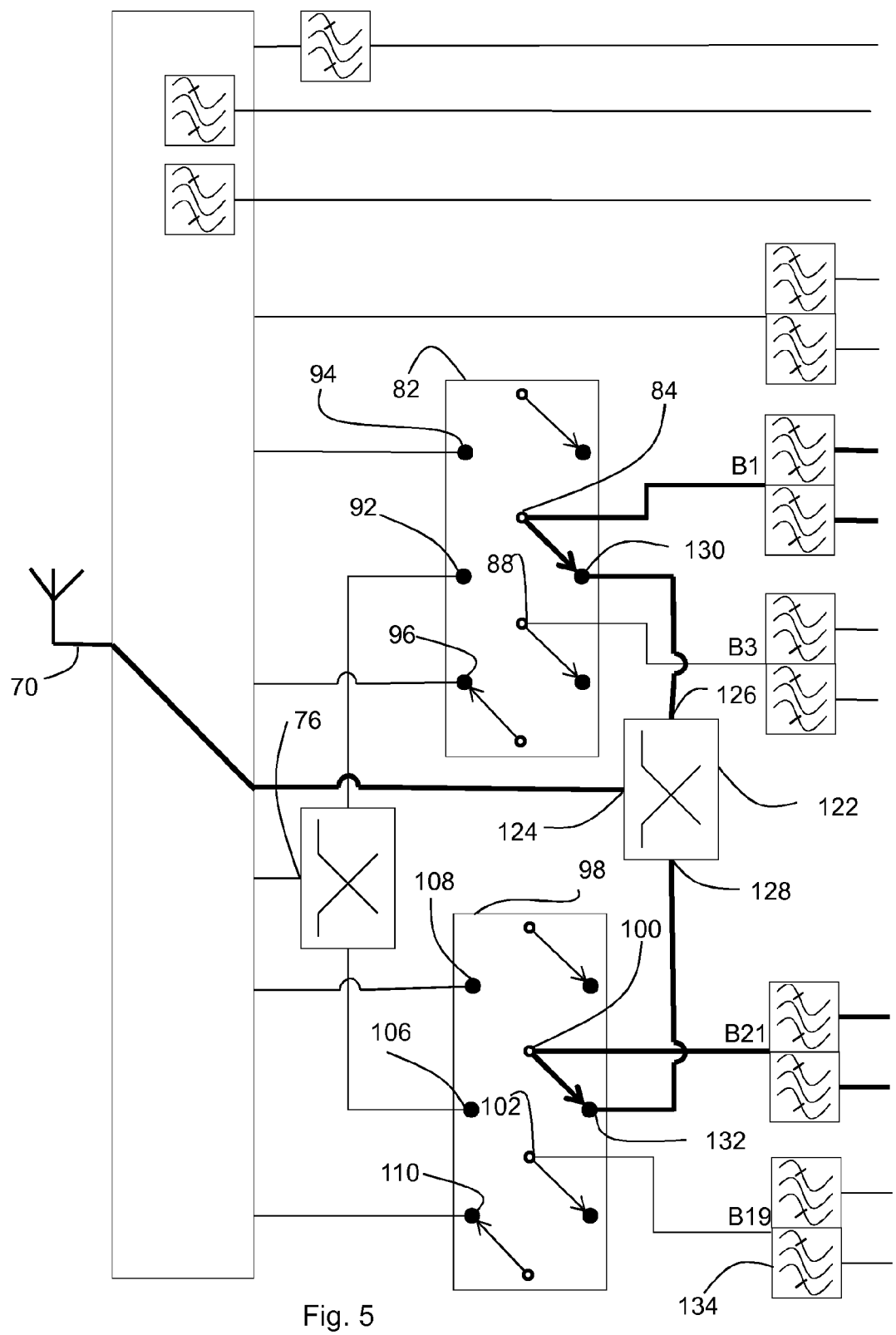
FIG. 5 is a diagrammatic representation of an example of an apparatus of another embodiment using the switching arrangement of FIG. 1.

FIG. 5 depicts an apparatus for allowing selective sharing of an antenna 70 by a plurality of frequency bands which uses the switching arrangement of FIG. 1. The antenna 70 can be switched to a single one of the plurality of frequency bands or shared by two frequency bands simultaneously in a carrier aggregation mode. The construction of this embodiment is the same as the embodiment of FIG. 3 except as described below.

In this embodiment a second diplexer 122 is provided as an example of a frequency selective component. The second diplexer 122 has a common terminal 124 which is connected to the antenna switch, a first filtered terminal 126 and a second filtered terminal 128. The diplexer 122 has a second cut off frequency of approximately 1.6 GHz in this embodiment, although other embodiments may use other cut off frequencies depending on the specific band combinations required. A third common or shared CP 130 of the first SPS and the second SPS in the first switching arrangement 82 is connected to the first filtered terminal 126. A third common or shared CP 132 of the third SPS 132 in the second switching arrangement is connected to the second filtered terminal 128 of the second diplexer 122.

The fourth frequency band is provided with a frequency division duplexer 134 in this embodiment, allowing the use of the fourth frequency band to both transmit and receive data.

Providing a second diplexer gives more freedom in the frequencies selected for the first, second, third and fourth frequency bands. In particular, it is not necessary to split "high" bands to one switch arrangement and "low" bands to another because the two diplexers can have different cut off frequencies. If two diplexers are used the frequency responses of diplexers are impacted less by pass band insertion loss.

For example, in a more specific configuration, the apparatus is configured to allow the use of 3GPP bands 1, 3, 19 and 21 to be combined in carrier aggregation combinations of 3+19, 3+21, 1+21 and 1+19. A duplexer for band 1 is connected to the pole 84 of the first SPS switch. A duplexer for band 3 is connected to the pole 88 of the second SPS switch. A duplexer for band 21 is connected to the pole 100 of the third SPS switch. A receive filter for Band 19 is connected to the pole 102 of the fourth SPS switch. The bands are distributed between the two switching arrangements so that the "High" side of all the combinations are on the first switching arrangement and the "low" side of all the combinations are on the second switching arrangement. However, unlike the embodiment of FIG. 3, the frequency of band 21 (1447.9-1462.9 MHz & 1495.9-1510.9 MHz) is above 1.5 GHz so the 1.5 GHz cut off frequency of the first diplexer is unsuitable. Instead, the second diplexer is provided with a cut off frequency 1600 MHz for use of band 21 in a carrier aggregation mode. In another embodiment band 21 may be connected to a switching arrangement on the "high" side of a frequency selective component. This can allow CA with band 28 connected to the "low" side in some embodiments.

As with the embodiment of FIG. 3, further band-specific filtering can be provided for bands which are not used in carrier aggregation. For example, filtering for bands 6 and 28 can be provided connected directly to a terminal of the antenna switch. Likewise, DCS received and 2G High and Low bands are provided by other antenna switch terminals as described above for the embodiment of FIG. 3. Other filters may be included according to the particular requirements of the arrangement concerned.

FIG. 5 depicts the configuration of the switch arrangements and antenna switch to allow the use of bands 1 and 21 in carrier aggregation mode. The embodiment can have various different configurations depending on the operation mode required. The configuration of the switching arrangements 82, 98 and antenna switch 72 to allow sharing of the antenna 70 for the combinations of bands 3+19, 3+21, 1+21 and 1+19 and to allow bands 1, 3, 19 and 21 to use the antenna in isolation when carrier aggregation is not required is summarized in table 3 below. Table 3 lists the configurations of the antenna switch and each SPS switch in terms of the contact points and terminals connected in a signal path, using the reference numbers of FIG. 5. Connections from the antenna switch are referred to by the CP of an SPS switch or terminal of a multiplexer which is connected to the antenna 70. Where a band is not used, the connections are chosen to isolate the band specific components for that band, this can be achieved in a variety of ways and is indicated "I" in the connection description. In some embodiments, isolation is achieved by connecting a pole to a CP which is not connected to the antenna switch, in other embodiments a dedicated "isolate" position can be provided in which the pole is not connected to any CP.

TABLE 3

Connections for band combinations in FIG. 5

| Operation Mode | 1 | 3 | 19 | 21 | 1 + 19 | 1 + 21 | 3 + 19 | 3 + 21 |
|---|---|---|---|---|---|---|---|---|
| Antenna Switch connected to: | 94 | 96 | 108 | 110 | 76 | 124 | 76 | 124 |
| First SPS Switch pole 84 connected to: | 94 | I | I | I | 92 | 130 | I | I |
| Second SPS Switch pole 88 connected to: | I | 96 | I | I | I | I | 92 | 130 |
| Third SPS Switch pole 100 connected to: | I | I | 108 | I | I | 132 | I | 132 |
| Fourth SPS Switch pole 102 connected to: | I | I | I | 110 | 106 | I | 106 | I |

Thus, this embodiment demonstrates how more than one multiplexer can be provided by connecting it to a common or shared CP of an SPS in the switching arrangements. This can allow different combinations of bands to be achieved in a simple construction. A further advantage is that both multiplexers can be bypassed by a single switch, minimizing the additional insertion loss when the multiplexers are switched out of the signal path.

In a further embodiment, the apparatus of FIG. 3 can be adapted to allow the combinations of Band 1, 3, 19 and 21 by replacing the diplexer with a diplexer having a cut off frequency of approximately 1.6 GHz. However, performance can be optimized in the embodiment of FIG. 5 where two diplexers with different cut off frequencies are provided.

Figure 6:
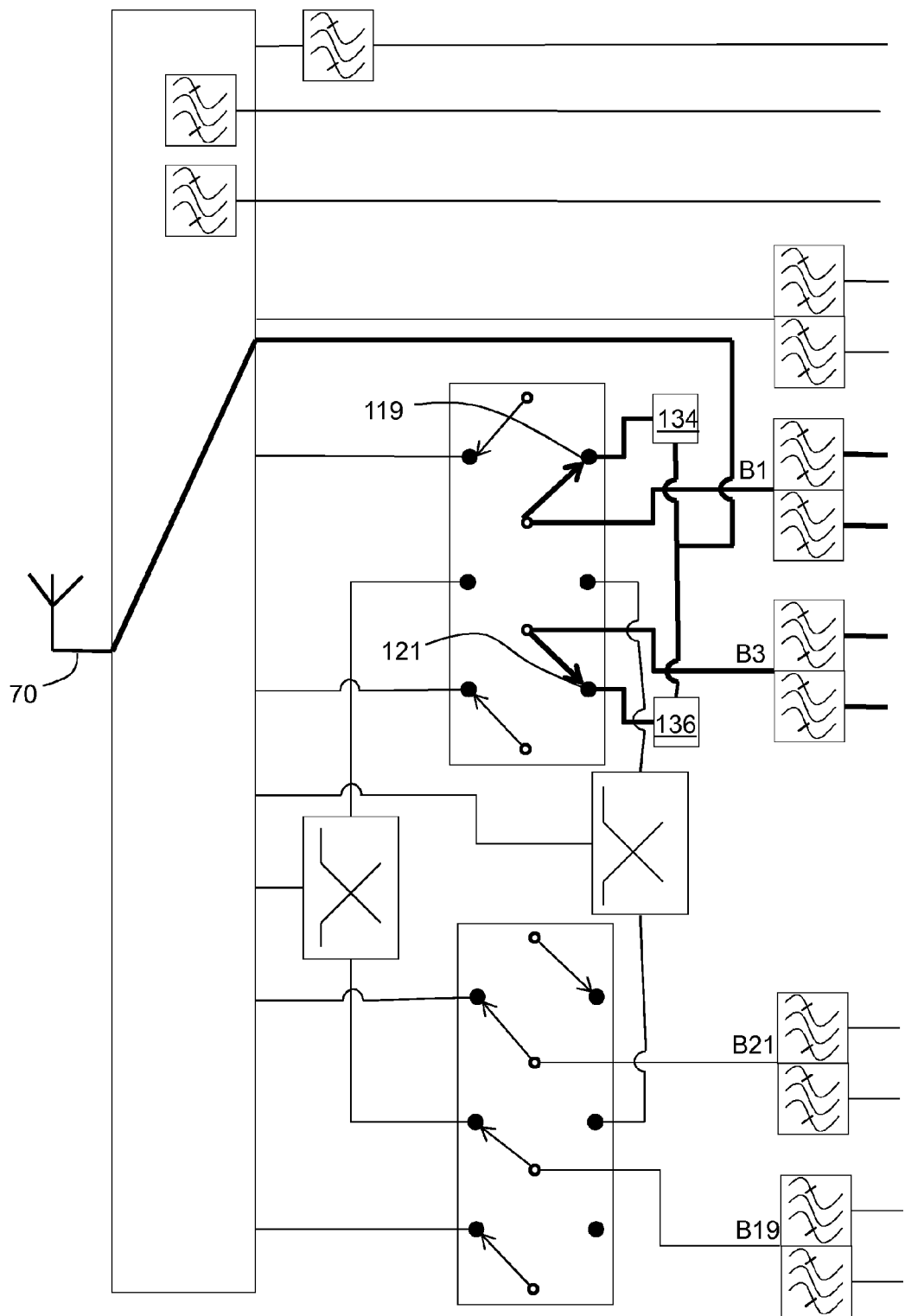
FIG. 6 is a diagrammatic representation of an example of an apparatus of another embodiment using the switching arrangement of FIG. 1.

A further embodiment of an apparatus for sharing an antenna between bands is depicted in FIG. 6. The construction of this embodiment is the same as the embodiment of FIG. 5, except as described below. This embodiment adds matching similar to the embodiment of FIG. 4 to allow a further combination of bands in carrier aggregation.

Specifically, a first matching 134 and a second matching 136 is provided as an example of a frequency selective component that can be used when frequency bands to be combined in carrier aggregation have frequencies that are substantially close to each other. In this situation, matching can provide better performance than a diplexer, although diplexers and other frequency selective components can be used in other embodiments. The first matching 134 has a first end which is connected to a first end of the second matching 136 and to a terminal of the antenna switch. A second end of the first matching 134 is connected to a further CP 119 of the first SPS of the first switching arrangement. A second end of the second matching 136 is connected to a further CP 121 of the second SPS of the second switching arrangement.

In this embodiment, the first and second matchings 134, 136 have phase shift chosen so that the frequencies above 1900 MHz are provided to the further CP 118 119 of the first SPS (for 3GPP Band 1) and frequencies below 1900 MHz are provided to the further CP 120 121 of the second SPS (for 3GPP Band 3). Here, the separation of only 40 MHz between the highest frequency in Band 3 and the lowest frequency in Band 1 makes using matching an appropriate choice.

Figure 7:
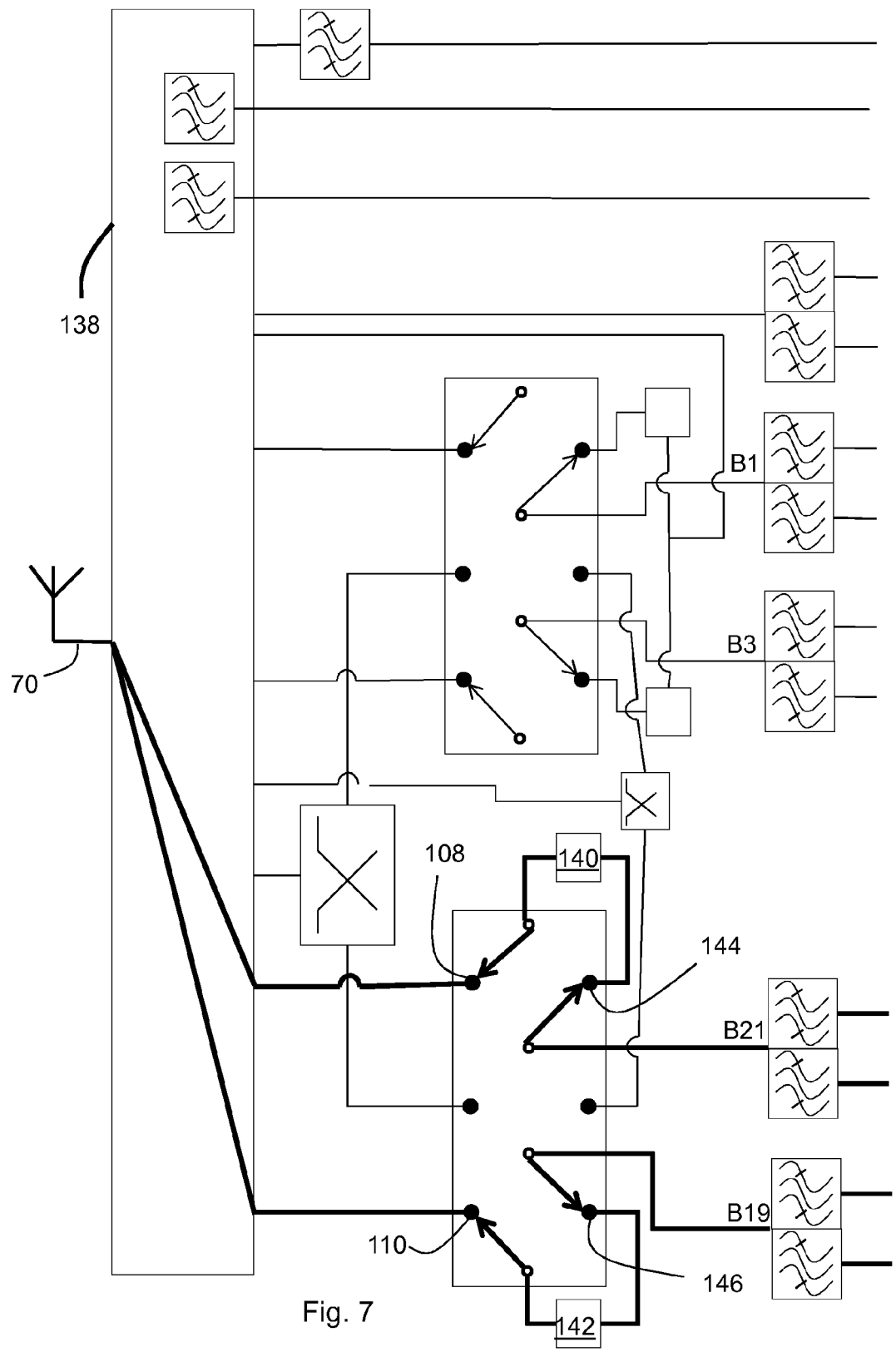
FIG. 7 is a diagrammatic representation of an example of an apparatus of another embodiment using the switching arrangement of FIG. 1.

A further embodiment of an apparatus for sharing an antenna between bands is depicted in FIG. 7. The construction of this embodiment is the same as the embodiment of FIG. 6, except as described below.

In this embodiment an antenna switch 138 is used which can connect one or two of its terminals simultaneously to the antenna 70. When the antenna switch can connect two terminals to the antenna simultaneously bands can share the antenna 70 directly by connecting them each to one of the terminals connected to the antenna switch. However, in that case the interaction of the frequencies of the two bands to be combined must be considered and it is likely that additional matching is needed.

To this end, the embodiment of FIG. 7 includes a third matching 140, for use with the frequency band connected to the pole of the third SPS, and fourth matching 142, for use with the frequency band connected to the pole of the fourth SPS. The third and fourth matching 140, 142 are connected between the pole and a first CP of respective matching switches of the second switching arrangement. The first CP of one matching switch is common to, connected to or shared with a further CP 144 of the third SPS. A second CP of the one matching switch is common to, connected to or shared with the first CP 108 of the third SPS, which is connected to the antenna switch 138. The first CP of the other matching switch is common to, connected to or shared with a further CP 146 of the fourth SPS. A second CP of the other matching switch is common to, connected to or shared with the first CP 110 of the fourth SPS, which is connected to the antenna switch 138.

In this embodiment the third and fourth matching 140, 142 allow bands 19 and 21 to be used together in a carrier aggregation mode. This mode is depicted in bold in FIG. 7. The antenna switch is configured to connect the antenna to both the first CP 108 of the third SPS and the second CP 110 of the fourth SPS. The third matching 140 is switching into signal path by connecting the one matching switch to the CP 108 and the third SPS to the further CP 144. The fourth matching 142 is switched into the signal path by connecting the other matching switch to the CP 110 and fourth SPS to the further CP 142.

In use, this embodiment enables matching to be provided which can be switched in or out of the signal path as required. When not required only a single switch is required to connect the band-specific filtering directly to the antenna switch, minimizing insertion loss.

Figure 8:
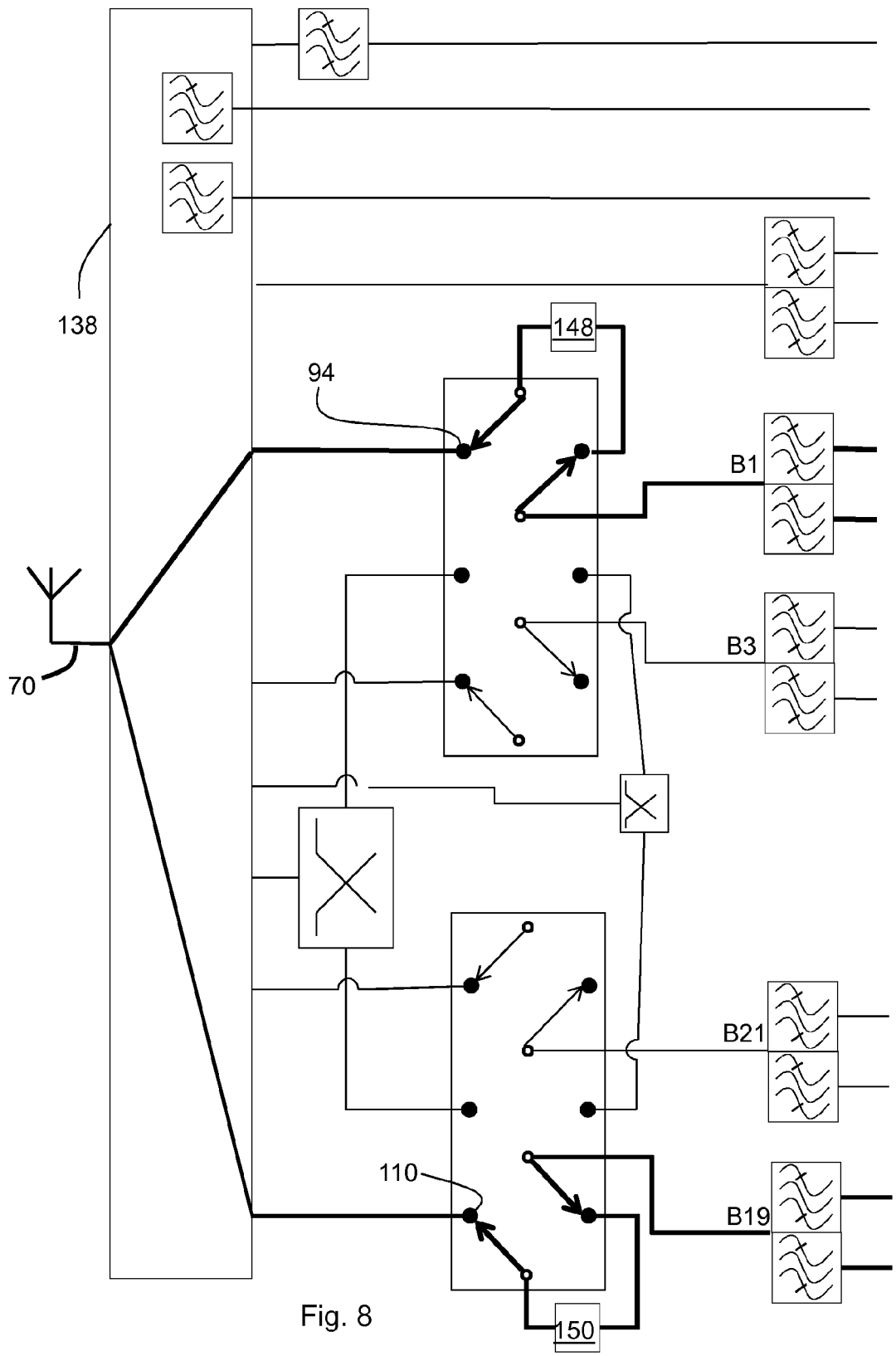
FIG. 8 is a diagrammatic representation of an example of an apparatus of another embodiment using the switching arrangement of FIG. 1.

Another embodiment is depicted in FIG. 8 which allows antenna 70 to be shared by two or more frequency bands in carrier aggregation mode. The construction of this embodiment is the same as FIG. 5, except as described below. As with the embodiment of FIG. 7, the antenna switch 138 can connect two of terminals to the antenna 70 simultaneously. In addition, switchable matching 148, 150 is provided for the first and fourth frequency bands respectively (3GPP Band 1 and 19) allowing them to be combined for carrier aggregation by connecting the first CP 94 of the first SPS to the antenna and the first CP 110 of the fourth SPS to the antenna using the antenna switch. In addition matching 148, 150 is switched into the respective signal path to allow the two band to simultaneously share antenna 70.

This embodiment therefore provides an alternative way to combine bands 1 and 19 rather than via the first multiplexer 74 as in the embodiment of FIG. 5. The different alternatives can have different implementation and performance criteria. For example, selection criteria to choose between alternatives can include one or more of: insertion loss, integration size, integration technology, isolation, linearity, Intermodulation Distortion (IMD) performance and harmonic performance.

A variation of this embodiment also allows the combination of bands connected through a switching arrangement described above with reference to FIG. 1 with other bands connected directly to the antenna switch, not through the switching arrangement. For example, the antenna switch can be configured to connect the antenna to the first CP 108 of the third SPS in the second switching arrangement and to connect the antenna to the duplexer 120 simultaneously. In this embodiment the duplexer 120 has filtering for 3GPP Band 28. The matching 150 is switched into the signal path for Band 19 and then allows Band 28 and Band 19 to operate in carrier aggregation mode.

Although the combination of two bands in carrier aggregation has been described above, it will be appreciated that the invention is not limited to combinations of two bands. When the antenna switch 138 can connect two of its terminals to the antenna simultaneously, further embodiments can allow the combination of three or more bands by using the switching arrangement of FIG. 1 to share a connection to one of the terminals between two bands.

Embodiments which may allow the simultaneous use of three bands can include one or more of the following features:

An antenna switch which can combine two or more throws simultaneously and in one of the throws one or more bands for carrier aggregation are conveyed An antenna multiplexer is provided with a first branch conveying at least two bands and a second branch conveying at least one band.

An antenna multiplexer with antenna impedance tuning capability is used with a first branch conveying at least two bands and a second branch conveying at least one band.

The matching network 134/136 described above with reference to FIG. 6 can have its common point connected to a multiplexer branch instead of an antenna switch. A second branch can convey at least one band.

Figure 9:
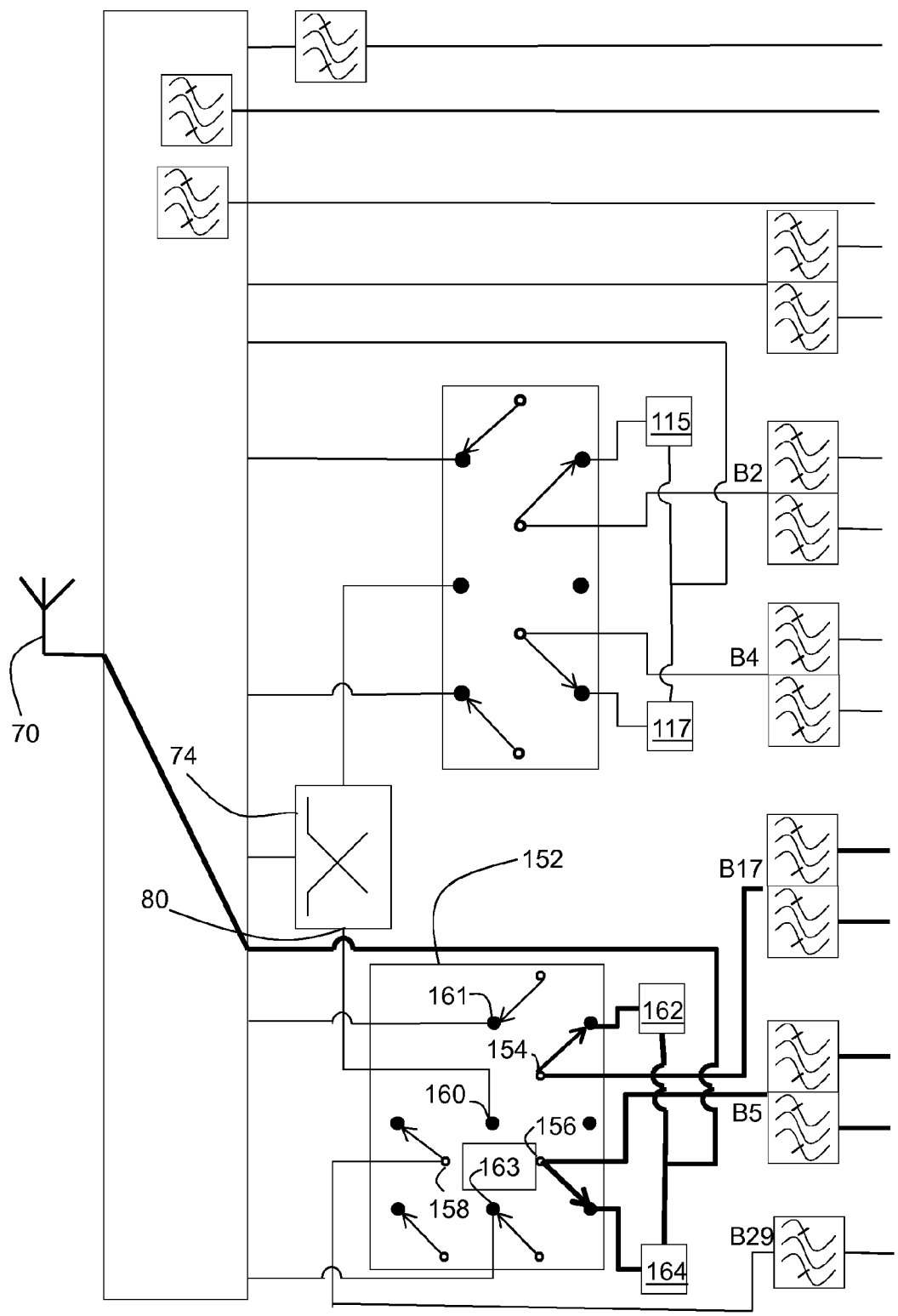
FIG. 9 is a diagrammatic representation of an example of an apparatus of an embodiment using the switching arrangement of FIG. 1 and the switching arrangement of FIG. 2.

FIG. 9 depicts an embodiment in which an antenna 70 can be shared between two frequency bands in carrier aggregation. The construction of this embodiment is the same as the embodiment of FIG. 4 except as described below.

In this embodiment three frequency bands can be selectively connected to the low frequency terminal 80 of the diplexer 74 by replacing the second switching arrangement 98 with a second switching arrangement 152 constructed as described above with reference to FIG. 2. This allows filtering for 3GPP Band 5 to be connected to the low frequency terminal of the diplexer 74 in addition to the filtering for 3GPP Bands 17 and 29. Specifically, the switching arrangement 152 comprises a third, fourth and fifth SPS with poles 154, 156, 158 connected to band specific filtering for 3GPP bands 17, 5 and 29, respectively. A common or shared CP 160, which is shared by all of the third, fourth and fifth SPS, is connected to the low frequency terminal 80 of the diplexer 74.

A second CP 161 of the third SPS is connected directly to the antenna switch. A second CP 163 is shared by both the fourth SPS and the fifth SPS and is also connected to the antenna switch. Therefore, band-specific filtering connected to the poles 154, 156, 158 of the third, fourth and fifth SPS can be connected directly to the antenna switch for use in modes where carrier aggregation is not required.

Matching can also be provided to allow antenna sharing by two of the bands in the low frequency side, in the same way as first and second matching 115, 117 allows antenna sharing by two bands on the high frequency side. Third matching 162 and fourth matching 164 is provided. The first ends of third matching 162 and fourth matching 164 are connected to each other and connected to the antenna switch. The second end of third matching 162 is connected to a further CP of the third SPS in the second switching arrangement 152. The second end of the fourth matching 164 is connected to a further CP of the fourth SPS in the second switching arrangement 152.

Thus, in this embodiment 3GPP bands can be combined as 2+29, 4+29, 2+17, 4+17, 5+2, 5+4 and 2+4 using similar principles as described above for FIG. 4. In addition bands 5+17 can be combined using the matching 162, 164. The signal path for bands 5+17 sharing the antenna 70 is depicted in FIG. 9. In another embodiment matching can be provided between a CP of the fourth SPS and a CP of the fifth SPS to enable combinations of bands 5+29.

In other embodiments different combinations of frequency bands can be provided. A switching arrangement as described with reference to FIG. 2 can also be provided by the high frequency output of a multiplexer. This would allow combinations of six different frequency bands in carrier aggregation mode while requiring the antenna switch to only connect one of its terminals to the switching arrangement.

The principles of the invention can also be applied to an apparatus which has more than one antenna. For example, switching arrangements can be provided to allow each antenna to be shared. In another embodiment, depicted in FIG. 10, a separate antenna is provided which is used when 3GPP Band 7 operates in isolation. 3GPP Band 7 uses frequencies centered around 2.5 GHz. Although these frequencies can be received acceptably with a multiple purpose antenna that can receive all 3GPP frequencies, performance can be improved when Band 7 is used in isolation by providing a dedicated Band 7 antenna which is configured for use with frequencies around 2.5 GHz.

Figure 10:
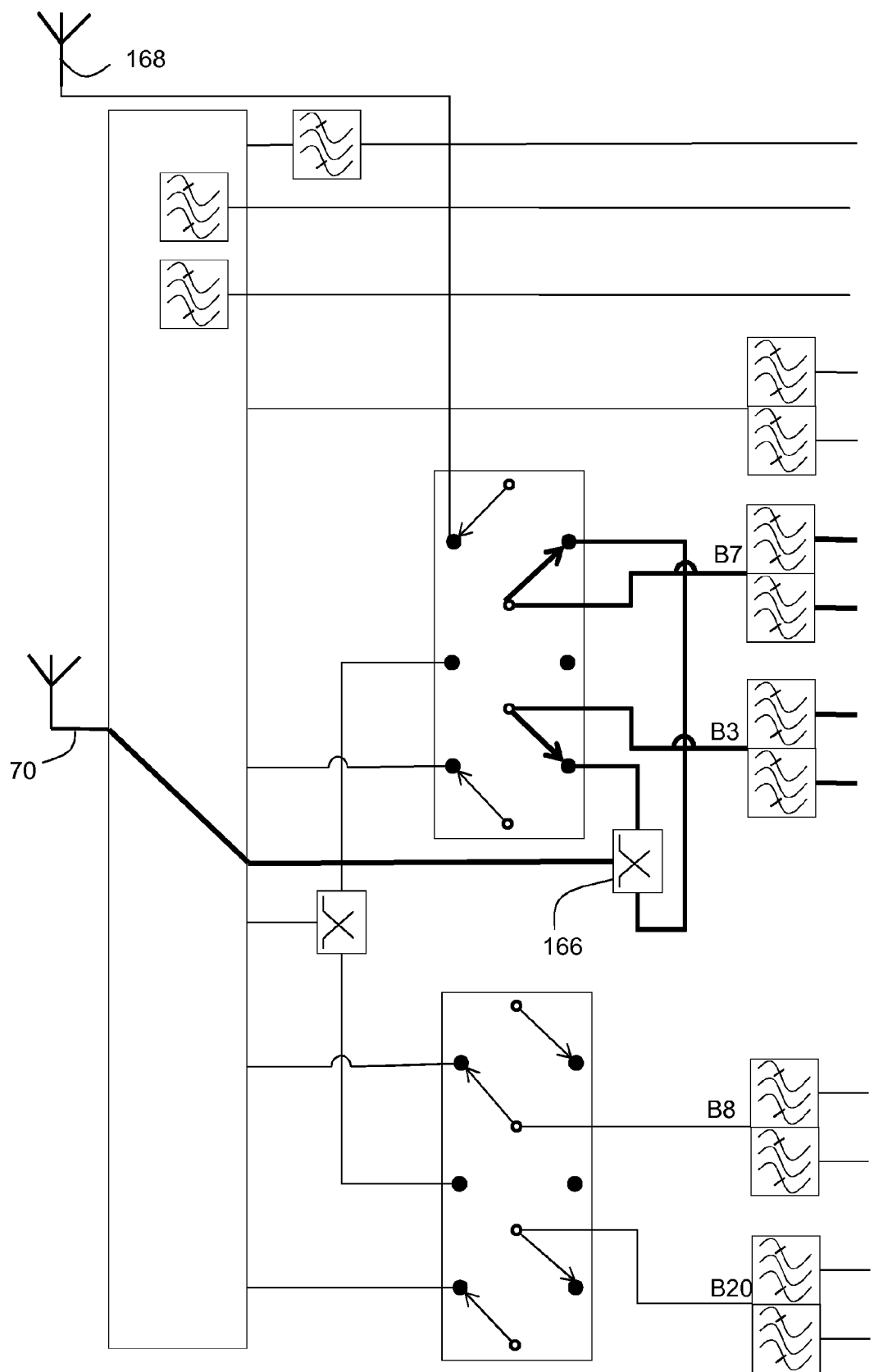
FIG. 10 is a diagrammatic representation of an example of an apparatus of another embodiment using the switching arrangement of FIG. 1.

The construction of the embodiment of FIG. 10 is the same as the embodiment of FIG. 3 except as described below. In addition to the embodiment of FIG. 3, the embodiment of FIG. 10 includes a second multiplexer, specifically a diplexer 166 and a second antenna 168 which is optimized for frequencies around 2.5 GHz. This embodiment is also provided with band specific filtering for different frequency bands connected to the first and second switching arrangement, specifically filtering for 3GPP Band 7 is connected to the pole of the first SPS in the first switching arrangement, filtering for 3GPP Band 3 is connected to the pole of the second SPS in the first switching arrangement, filtering for 3GPP Band 8 is connected to the pole of the third SPS in the second switching arrangement and filtering for 3GPP Band 20 is connected to the pole of the fourth SPS in the second switching arrangement.

The second antenna 168 is connected to the first CP of the first SPS in the first switching arrangement. Therefore, when it is desired to use 3GPP band 7 in isolation, the first SPS can be connected to its first CP to use the second antenna. This gives improved performance because the second antenna can be optimized to the frequencies of 3GPP band 7.

As depicted in FIG. 10, this embodiment also includes diplexer 166, which can be omitted in further embodiments. The diplexer 166 has a cut off frequency optimized for bands 3 and 7 to share the antenna 70 in carrier aggregation. The diplexer 166 has a common terminal which is connected to the antenna switch, a high filtered terminal which is connected to a further CP of the first SPS in the first switching arrangement and a low filtered terminal which is connected to a further CP of the second SPS in the first switching arrangement.

In use, the embodiment of FIG. 10 allows 3GPP bands 7+20, 7+8, 3+8, 3+20 and 7+3 to operate in carrier aggregation modes and share the first antenna 70. In another embodiment 3GPP bands 8+20 can also be combined. This can be achieved by providing a further diplexer in a similar way as described above for the combination of bands 3+7. Alternatively, bands 8+20 can be combined by providing matching in a similar way to matching 140, 142 which allows bands 19+21 to be combined as described above with reference to FIG. 7, or matching 134, 136 which allows bands 1+3 to be combined as described above with reference to FIG. 6.

In this embodiment, the second antenna is only used for Band 7 in isolation. Other embodiments may have different configurations. For example the diplexer 166 could be connected to second antenna 168. When the second antenna can be connected to more than one CP, a second antenna switch can be provided to switch the second antenna. Connecting the second antenna 168 to only one CP, as in the embodiment of FIG. 10, can avoid the cost and complexity of providing a second antenna switch.

Figure 11:
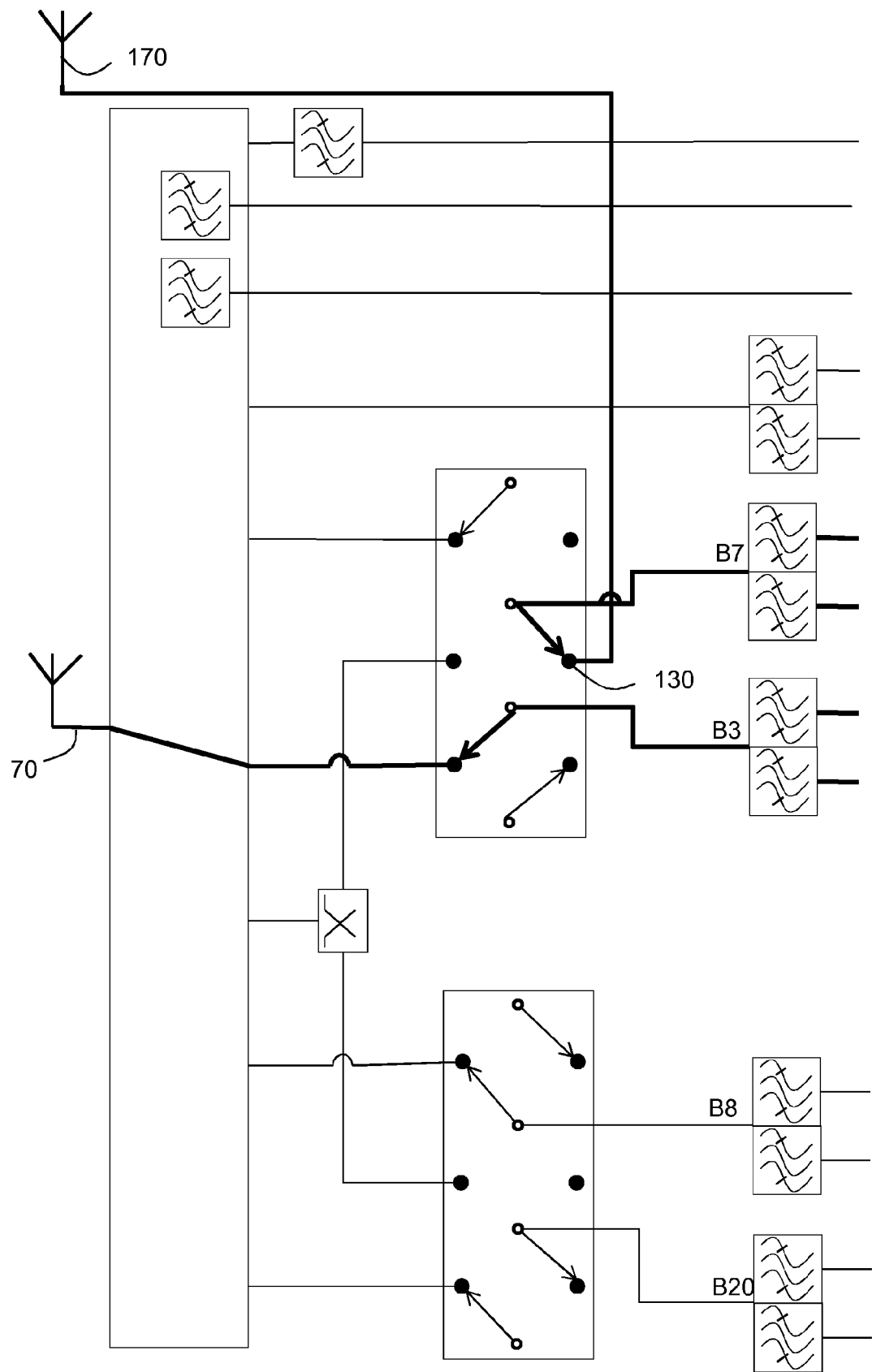
FIG. 11 is a diagrammatic representation of an example of an apparatus of another embodiment using the switching arrangement of FIG. 1.

FIG. 11 depicts a further embodiment. The construction of this embodiment is the same as the embodiment of FIG. 10, except as described below. In this embodiment a second antenna 170 can support 3GPP Band 7 and Band 3. The second antenna is connected to the third common or shared CP 130 of the first SPS and the second SPS and the diplexer 166 of the FIG. 10 embodiment is omitted.

This embodiment allows the second antenna to be used for either Band 3 or Band 7. It also allows bands 3 and 7 to be used in CA without requiring additional frequency selective components in the signal path because the first antenna 70 can be used for one of bands 3 and 7 and the second antenna 170 can be used for the other of bands 3 and 7. For example, when 3GPP bands 3 and 7 are combined the switching arrangement can be configured so that:

Band 3 of a primary cell is directed to the first antenna 70 and band 7 of a secondary cell is directed to the second antenna 170 (depicted in FIG. 11); or Band 7 of a primary cell is directed to the first antenna 70 and band 3 of a secondary cell is directed to the second antenna 170.

Therefore, this embodiment allows Bands 3 and 7 to be used with other bands in CA or in isolation. When used in isolation there is only one switch in the path. Furthermore, no additional frequency selective component, such as a matching or a diplexer is needed for Band 3 and Band 7 combination, reducing insertion loss for the Band 3 & Band 7 combination. This can be advantageous for Band 3 in particular. 3GPP Band 3 has a wide bandwidth and a narrow separation between the transmission and reception frequencies, thus a Band 3 duplexer can have a relatively high insertion loss as a component itself compared to other 3GPP bands.

Figure 12:
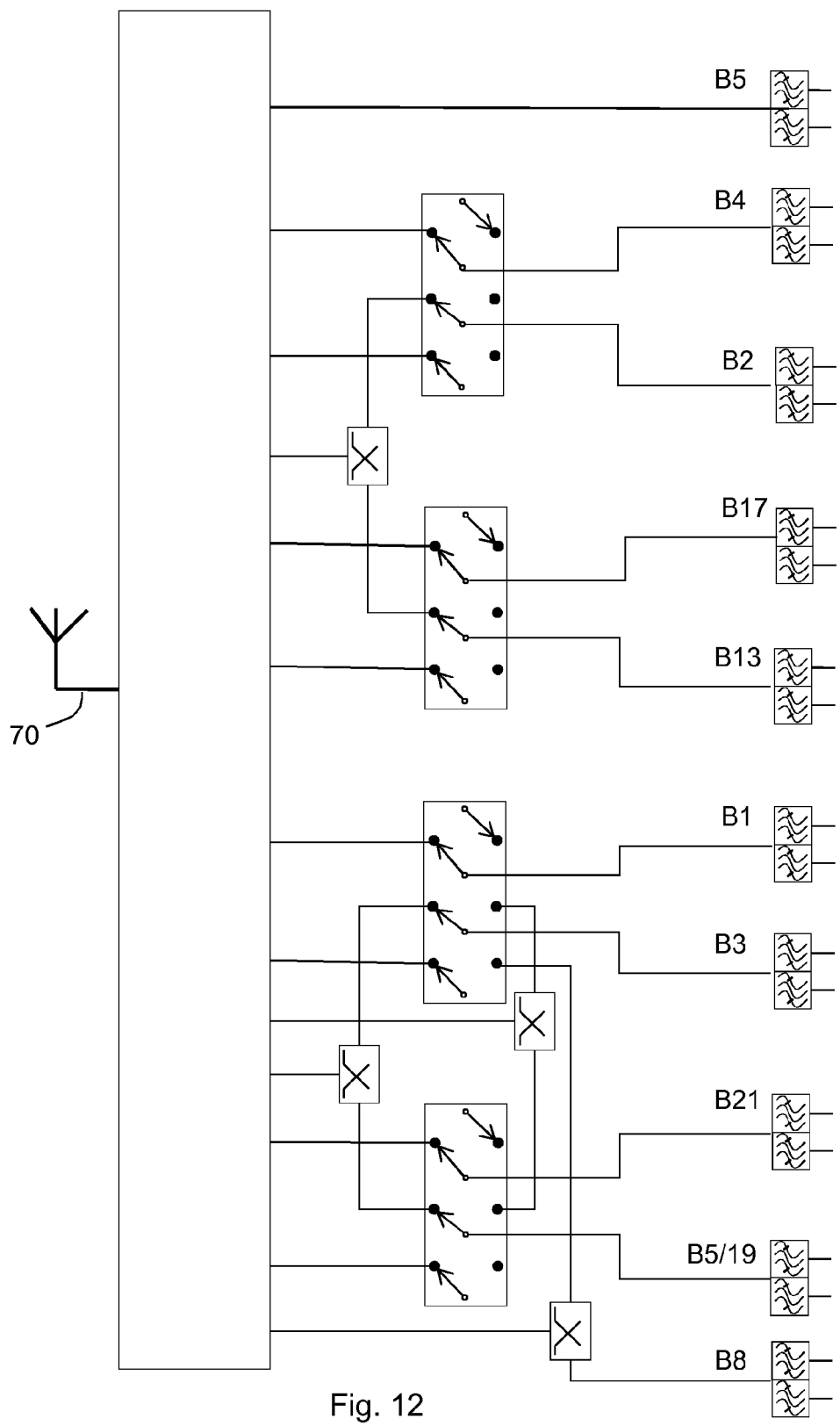
FIG. 12 is a diagrammatic representation of an example of an apparatus of another embodiment using the switching arrangement of FIG. 1.

In a further embodiment (not shown) the first antenna 70 may have an antenna impedance tuner. It is then favorable that primary carrier signals are conveyed via the antenna impedance tuner. Thus, in this embodiment the second antenna 170 is used for a secondary carrier according to the particular radio use case. In other word the selection of which of bands 3 and 7 is received on which antenna can depend on which is considered the primary carrier. In UL CA or multi-RAT usage case, frequency band allocations in which the operational frequencies need or would benefit from an antenna impedance tuner are connected to first antenna 70. FIG. 12 depicts an embodiment of the invention in which four switching arrangements are provided to allow operation of 3GPP bands 1, 2, 3, 4, 5, 8, 13, 17 and 19 in isolation in carrier aggregation combinations of 4+17, 4+13, 2+17, 1+21, 1+19, 3+5, 3+19 and 8+3. Such a combination allows the apparatus to function in different geographic regions, including North America, Europe and Asia-Pacific.

A single antenna 70 can be shared by these bands by providing first, second, third and fourth switching arrangements as described above with reference to FIG. 1. Further outputs of the antenna switch can be connected directly to band specific filtering for additional bands, or be provided with integrated or external filtering for DCS or 2G high and low bands, as with the embodiment of FIG. 3 above.

In some embodiments a separate band 7 antenna and associated band specific filtering may be provided (for situations where carrier aggregation with band 7 is not required).

This embodiment demonstrates how the principles of the invention can be extended to allow multiple bands to share an antenna with a simple construction. All the bands apart from 3GPP band 8 can bypass frequency selective components for carrier aggregation when operating in single band mode. Furthermore, when the frequency selective components are bypassed on a single switch in the switching arrangement is present in the signal path compared with a direct connection to the antenna switch, providing only a small additional insertion loss.

The embodiments described above with reference to FIGS. 3-12 have arranged the components in the signal path in the direction from the antenna as: antenna switch, frequency selective component, switching arrangement and band specific filtering. The invention is not limited to this order of components. For example, the frequency selective component may be provided between the antenna and one or more antenna switches.

Figure 13:
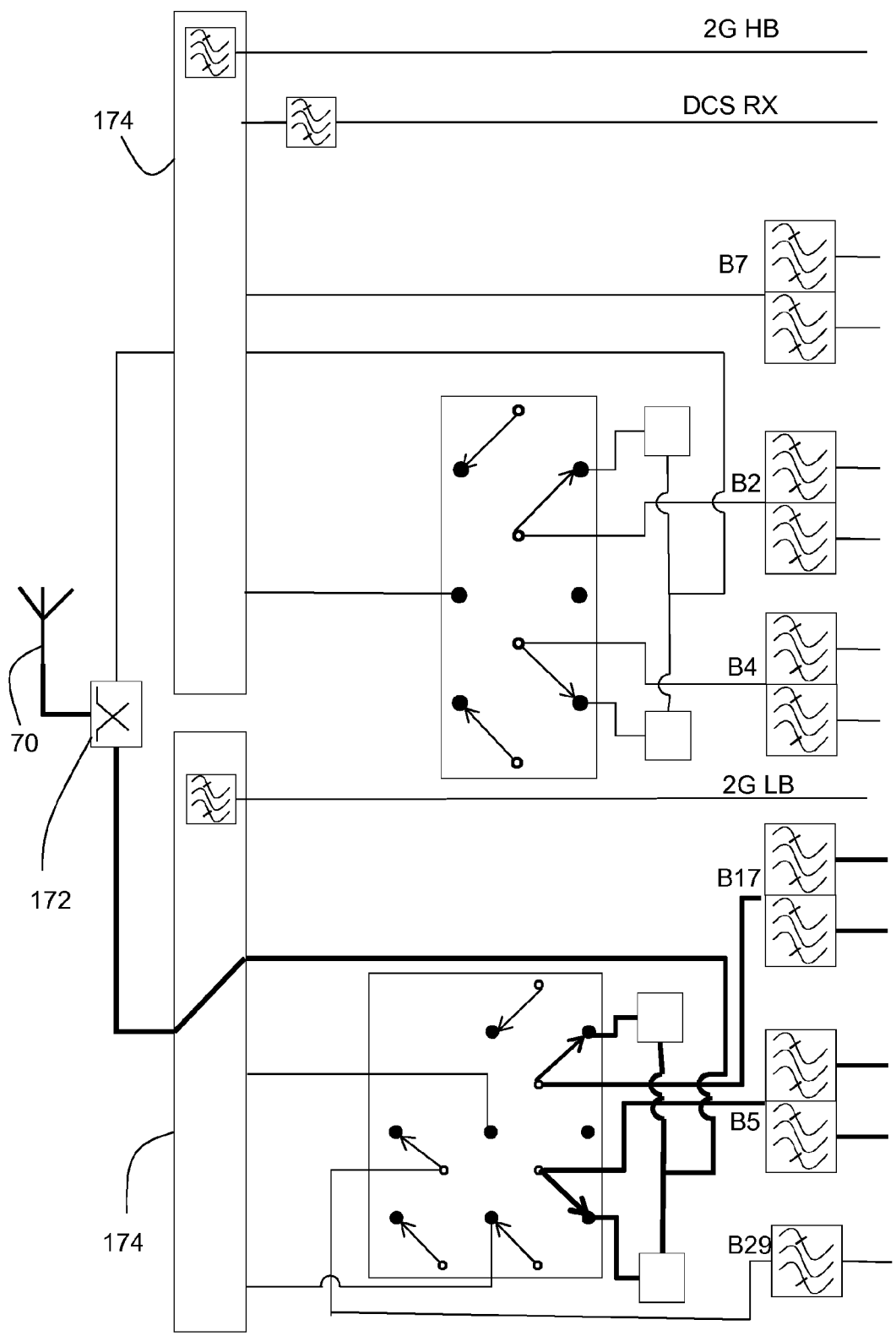
FIG. 13 is a diagrammatic representation of an example of an apparatus of another embodiment using the switching arrangement of FIG. 1 and the switching arrangement of FIG. 2.

FIG. 13 depicts a further embodiment in which a frequency selective component is provided between the antenna and the antenna switch. The construction of FIG. 13 is the same as FIG. 9, except as described below. In this embodiment the single antenna switch and diplexer 74 of the FIG. 9 embodiment are replaced with a diplexer 172 which is positioned in the signal between the antenna 70 and first and second antenna switches 174, 176. In further embodiments the diplexer 172 may be a tunable diplexer with adjustable corner frequency.

The embodiment of FIG. 13 demonstrates that the switching arrangement of FIGS. 1 and 2 can be used in many configurations. For example, all of the embodiments discussed above could be adapted to have a frequency selective component closer to the antenna in the signal path than any antenna switch. While this may mean that the frequency selective component cannot be bypassed the switching arrangement allows a wide range of connection configurations.

Figure 14:
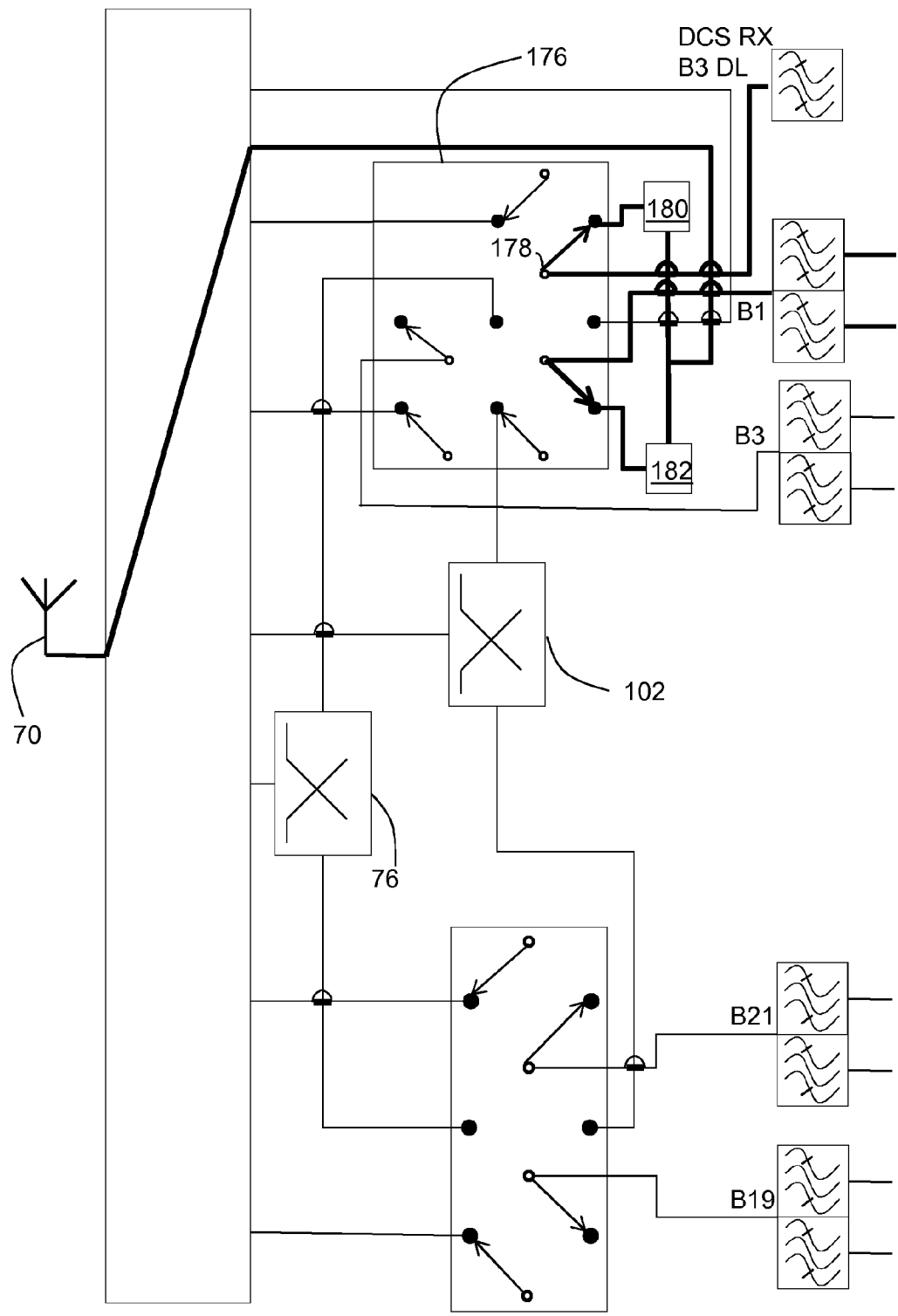
FIG. 14 is a diagrammatic representation of an example of an apparatus of another embodiment using the switching arrangement of FIG. 1 and the switching arrangement of FIG. 2.

FIG. 14 depicts a simplified representation of a further embodiment in which more than one set of band specific filtering is provided for the same frequency band allocation. This allows the band specific filtering to be selected dependent on the operating mode. The construction of the embodiment of FIG. 14 is the same as the embodiment of FIG. 5, except as described below.

This embodiment allows combinations of Band 3+19, 3+31, 1+21, 1+19, 1+3DL, 21+3DL and 19+3DL. "3DL" refers to using the downlink or receive portion of band 3, for example to achieved improved download performance or speed in CA with other bands. Band specific, duplex filtering for 3GPP Band 3 can be difficult to design because the uplink and downlink frequency ranges are relatively wide and the separation between them is narrow. As a result duplex filtering for 3GPP band 3 may have a relatively high insertion loss on its own, before the other components in the signal path are considered. If 3GPP band 3 is required to be used only on the downlink then a duplex filter is not required the insertion loss due to the band specific filtering can be reduced.

FIG. 14 depicts how a switching arrangement 176 of FIG. 2 can be used on the "high" side of duplexers 76 and 102 to provide an additional connection for band specific filtering. Filtering with a frequency response suitable for both DCS RX and 3GPP Band 3DL is connected to a pole 178 of an SPS for selective connection direct to the antenna switch, to a terminal of either duplexer 76 or 102, or to matching 180.

Matching 180 and 182 provides a network which allows the band specific filtering for DCS RX/3GPP Band 3 to share the antenna 70 with filtering for 3GPP Band 1. This configuration is shown in FIG. 14 with the signal paths for 3GPP Bands 1+3DL shown in bold.

In another embodiment, further matching can be provided to allow 3GPP bands B21 and B19 to be combined and use the antenna 70 simultaneously. The further matching can be connected to the switching arrangement for 3GPP Bands 21 and 19 in the same way as to switching arrangement 172 and can be provided instead of or in addition to the matching 180 and 182.

Other combinations of bands can share the antenna by changing the configuration of the switching arrangements and antenna switch as discussed above in relation to other embodiments. In further embodiments one or more of the elements depicted in FIG. 14 can be omitted if they not required for the frequency band allocation combinations used in a particular application. For example, in some embodiments the diplexer 102 can be omitted.

As depicted, FIG. 14 does not show band specific filtering which is not connected through the switching arrangement of FIG. 1 or 2. Such band specific filtering can be provided in other embodiments, for example as described above with reference to FIG. 5. Further embodiments may provide more than set of band specific filtering for frequency band allocations other than 3GPP band 3.

Figure 15:
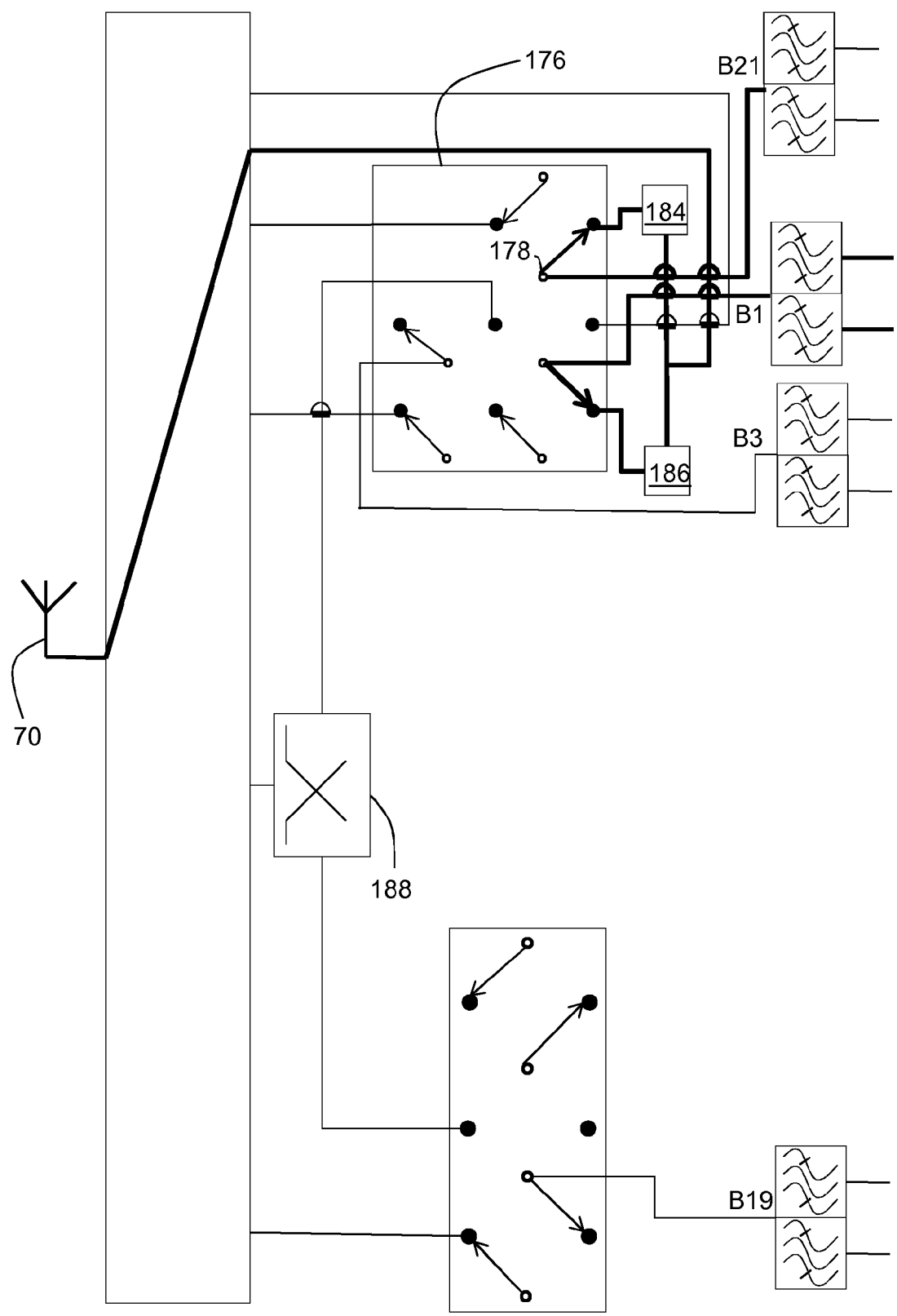
FIG. 15 is a diagrammatic representation of an example of an apparatus of another embodiment using the switching arrangement of FIG. 2.

FIG. 15 depicts a simplified representation of a further embodiment. The construction of this embodiment is the same as FIG. 14 except as described below. In this embodiment the switching arrangement 176 according to FIG. 2, for three sets of band specific filtering, is used to allow new band combinations to share the antenna 170 rather than provide more than one set of filtering for the same frequency band allocation.

As depicted in FIG. 15, the receive only filtering for DCS and 3GPP Band 3 in FIG. 14 is replaced with duplex filtering for 3GPP Band 21 which is connected to the pole 178 of a first SPS of the switching arrangement 176. As a result, only filtering for 3GPP band 19 is connected to the second switching arrangement and the diplexer 102 is omitted. Matching 184 and 186 has characteristics chosen to allow 3GPP bands 1 and 21 to share the antenna simultaneously and FIG. 15 depicts the signal path for the combination of 3GPP bands 1 and 21.

Combinations of 3GPP Bands 19+1, 19+3 and 19+21 are also possible using the diplexer 188. The Diplexer 188 has a corner frequency between its high pass and low pass bands between the highest frequency in 3GPP band 19 and the lowest frequency in 3GPP Band 21, for example, it can have a corner frequency of approximately 1.3 GHz.

In other embodiments the lower switching arrangement can be replaced with a single SPS having its pole connected to the filtering for 3GPP Band 19, one CP connected to a low pass terminal of the diplexer 188 and one CP connected to the antenna switch.

Various degrees of integration can be applied to the embodiments of FIGS. 3 to 15. In some embodiments all the components can be implemented as discrete components. In other embodiments, the antenna switch, switching arrangement and frequency selective components can be integrated into a single package. Another package with the same external connections could then be provided which does not include the switching arrangements and frequency selective components, allowing devices which do not operate in carrier aggregation to be produced with minimal production changes.

A package may contain two or more switching arrangements, antenna switch and special purpose switch as an integrated package or circuit. Further integration can be applied. For example, the module may contain one or more antenna switch, antenna diplexer, antenna impedance tuner functionality, coupler, antenna diplexer with antenna impedance tuner functionality, antenna aperture tuner, controller, control interface, power interface, coupler interface to measurement receiver, regulators, ESD protection, frequency selective filters, fundamental harmonic filter diplexer, duplexer, triplexer, quadplexer, switching apparatus, power amplifier, matching, LNA, RFIC, modem BB, application processor. The integration may be done by 2D, 3D, and/or stacking of structures in module layers.

Filter frequency response may be controllable according to the radio use case and the interference scenario in some embodiments. This may allow the Filter frequency response to be set to:

a bandwidth corresponding to the band allocation,
a bandwidth wider than band allocation,
a bandwidth of a specific carrier or carriers within a band allocation, or
a bandwidth wider than a specific carrier or carriers bandwidth Filter frequency response may be also altered in a first mode to a first band allocation and in a second mode to a second frequency band allocation. The frequency band allocations may be 3GPP frequency band allocations. Using filters with a frequency response that can be altered therefore allows fewer filters to be provided because a single filter can be altered to have the frequency response required for more than frequency band allocation.

In other embodiments the integration can be extended further, for example to include band specific filtering and possibly a Multi-Mode Power Amplifier (MMPA) within the same package. Further, the same package can also integrate one or more diversity antenna related circuitry, alternate antenna related circuitry, alternate RAT related circuitry, satellite positioning circuitry, antenna, MIMO antennas, RFIC, modem BB, modem on module, one or more on same chip modem, RFIC, alternate RAT, positioning receiver, application processor, EM, PM. on same shielding, interfaces.

Figure 16:
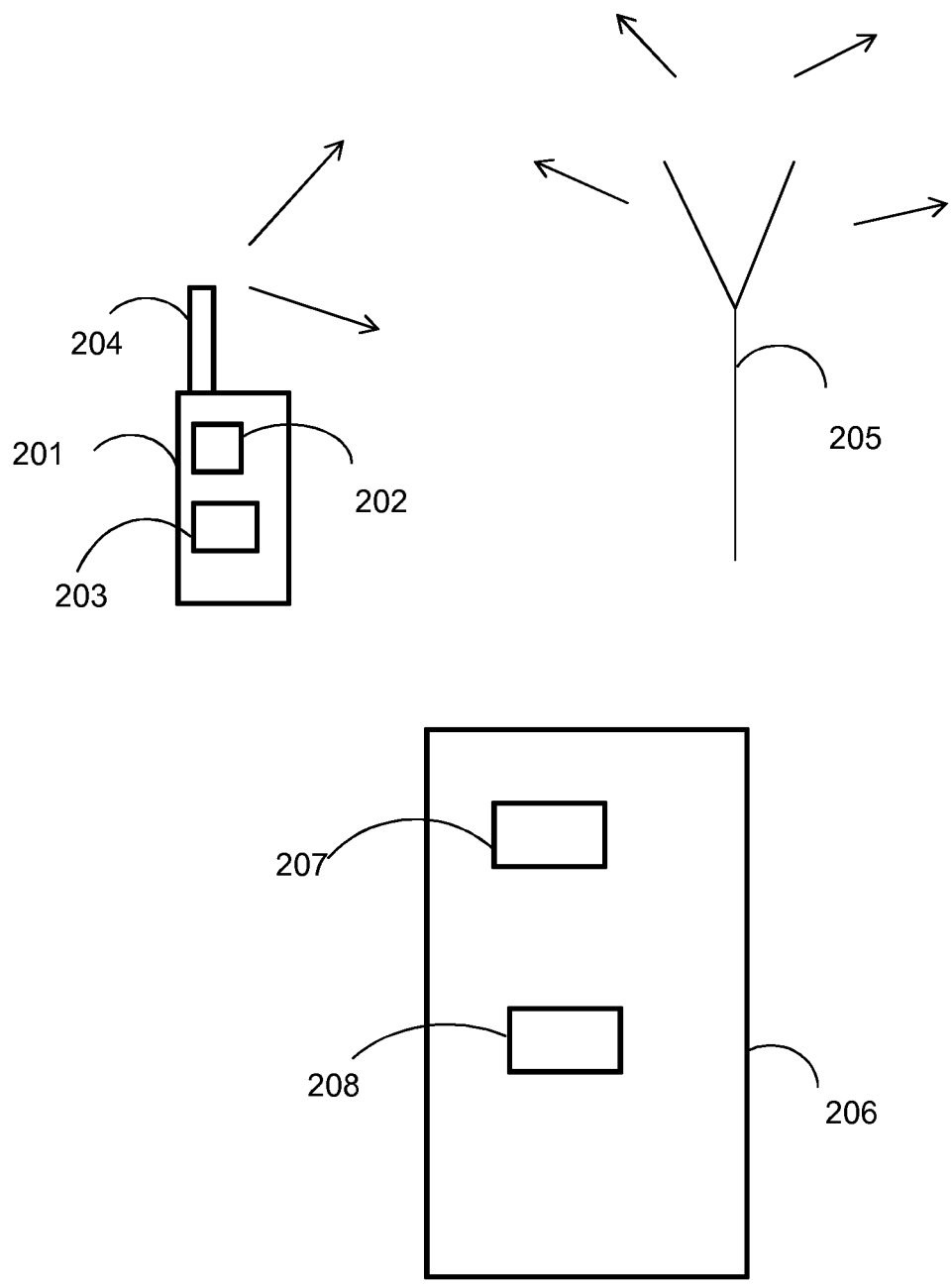
FIG. 16 is a diagrammatic representation of a user equipment in a wireless network in which embodiments of the invention can be used.

The above embodiments can be applied to the radio module of a user equipment or wireless device, as depicted in FIG. 16. In this case the user equipment is in the form of a mobile phone/smartphone 201. The user equipment 201 contains the necessary radio module 202, processor(s) and memory/memories 203, antenna 204, etc. to enable wireless communication with the network. The user equipment 201 in use is in communication with a radio mast 205 or alternative communication counterpart, such device to device communication. As a particular example in the context of UMTS (Universal Mobile Telecommunications System), there may be a network control apparatus 206 (which may be constituted by for example a so-called Radio Network Controller) operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. The network control apparatus 206 (of whatever type) may have its own processor(s) 207 and memory/memories 208, etc.

More specifically, embodiments of the invention can be applied to the radio module 202 so that the antenna 204 or antenna system 4 can be used by several frequency bands either in isolation or in combinations of frequency bands used for carrier aggregation and MIMO.

The above embodiments are to be understood as illustrative examples of the invention. Further embodiments of the invention are envisaged. The principles described above can be extended to many different arrangements of bands and frequency selective components and is not limited to the specific combinations described. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

I claim:

1. A switch arrangement comprising:
a first single pole switch having:
a pole for connection to filtering for a first frequency band, a first contact point, and a second contact point; and
a second single pole switch having:
a pole for connection to filtering for a second frequency band, a first contact point, and a second contact point, wherein
the first contact point of the first single pole switch is connected to the first contact point of the second single pole switch, and is connected to a frequency division multiplexer; and
the second contact point of the first single pole switch is connected to the second contact point of the second single pole switch, and is connected to another frequency division multiplexer.

2. The switch arrangement according to claim 1, wherein:
the first single pole switch has a third contact point; and
the second single pole switch has a third contact point.

3. The switch arrangement according to claim 1, wherein the first single pole switch has a further contact point for connection to a frequency selective component for the first frequency band.

4. The switch arrangement according to claim 3, wherein the second single pole switch has a further contact point for connection to another frequency selective component for the second frequency band.

5. The switch arrangement according to claim 3, further comprising:
a matching switch for selective connection of matching components in a signal path of the first frequency band, wherein the matching switch is a single pole switch having:
a pole for connection to one end of a matching network;
a first contact point connected to the further contact point of the first single pole switch for connection to another end of the matching network; and
a second contact point.

6. The switch arrangement according to claim 5, further comprising:
a second matching switch for selective connection of matching components in a signal path of the second frequency band, wherein the second matching switch is a single pole switch having:
a pole for connection to one end of a second matching network;
a first contact point connected to the further contact point of the second single pole switch for connection to another end of the second matching network; and
a second contact point.

7. The switch arrangement according to claim 1, further comprising:
a third single pole switch having:
a pole for connection to filtering for a third frequency band, a first contact point, and a second contact point, wherein
the second contact point of the third single pole switch is connected to the second contact point of the first single pole switch and the second contact point of the second single pole switch.

8. An apparatus for selective sharing of an antenna for at least one of carrier aggregation, multiple-input and multiple-output (MIMO) and multiple simultaneous radio access technologies, the apparatus comprising:
an antenna switch having an antenna terminal for connection to an antenna and a plurality of switchable terminals which are selectively connected to the antenna terminal;
a frequency division multiplexer having a common terminal and at least two filtered terminals, wherein the common terminal is connected to a switchable terminal of the antenna switch; and
a switch arrangement comprising:
a first single pole switch having:
a pole for connection to filtering for a first frequency band, a first contact point connected to another switchable terminal of the antenna switch, a second contact point, and a third contact point; and
a second single pole switch having:
a pole for connection to filtering for a second frequency band, a first contact point connected to another switchable terminal of the antenna switch, a second contact point, and a third contact point, wherein
the second contact point of the first single pole switch is connected to the second contact point of the second single pole switch and connected to one of the at least two filtered terminals of the frequency division multiplexer; and
the third contact point of the first single pole switch is connected to the third contact point of the second single pole switch and connected to another frequency division multiplexer.

9. The apparatus according to claim 8, further comprising:
a second switch arrangement, the second switch arrangement comprising:
a third single pole switch having:
a pole for connection to filtering for a third frequency band, a first contact point connected to another switchable terminal of the antenna switch, and a second contact point; and
a fourth single pole switch having:
a pole for connection to filtering for a fourth frequency band, a first contact point connected to another switchable terminal of the antenna switch, and a second contact point, wherein
the second contact point of the third single pole switch is connected to the second contact point of the fourth single pole switch and connected to another of the at least two filtered terminals of the frequency division multiplexer.

10. The apparatus according to claim 9, further comprising:
band-specific filtering connected to the pole of the first, second, third or fourth single pole switch, wherein
the band-specific filtering is configured to have a frequency response that is alterable.

11. The apparatus according to claim 8, wherein the frequency division multiplexer is a diplexer, triplexer, frequency response tunable diplexer or frequency response tunable triplexer.

12. The apparatus according to claim 8, wherein:
the another frequency division multiplexer has a common terminal and at least two filtered terminals;
the common terminal of the another frequency division multiplexer is connected to another switchable terminal of the antenna switch.

13. The apparatus according to claim 12, further comprising:
- a second switch arrangement, the second switch arrangement comprising:
  - a third single pole switch having:
    - a pole for connection to filtering for a third frequency band, a first contact point connected to another switchable terminal of the antenna switch, a second contact point, and a third contact point; and
  - a fourth single pole switch having:
    - a pole for connection to filtering for a fourth frequency band, a first contact point connected to another switchable terminal of the antenna switch, a second contact point, and a third contact point, wherein
- the second contact point of the third single pole switch is connected to the second contact point of the fourth single pole switch and connected to another of the at least two filtered terminals of the frequency division multiplexer; and
- the third contact point of the third single pole switch is connected to the third contact point of the fourth single pole switch and connected to one of the at least two filtered terminals of the another frequency division multiplexer.

14. The apparatus according to claim 12, wherein the frequency division multiplexer is a first diplexer and the another frequency division multiplexer is a second diplexer.

15. The apparatus according to claim 8, wherein the antenna switch is operable to connect two of the plurality of switchable terminals to the antenna terminal simultaneously.

16. The apparatus according to claim 8, wherein the first single pole switch has a further contact point and the apparatus comprises a frequency selective component that is connected to the further contact point.

17. The apparatus according to claim 16, wherein the frequency selective component is arranged to be selectively switched in or out of a signal path including the first single pole switch.

18. The apparatus according to claim 17, wherein
- the switching arrangement comprises a matching switch having a pole, a first contact point connected to the further contact point of the first single pole switch and a second contact point connected to the first contact point of the first single pole switch, and
- the frequency selective component is connected between the pole and the first contact point of the matching switch.

19. The apparatus according to claim 16, wherein the second single pole switch has a further contact point which is separate from the further contact point of the first single pole switch, and another frequency selective component is connected to the further contact point of the second single pole switch.

20. The apparatus according to claim 8, wherein the antenna switch comprises at least one switchable terminal which is connected directly to band-specific filtering.

* * * * *